(12) United States Patent
Henry

(10) Patent No.: US 9,513,149 B1
(45) Date of Patent: Dec. 6, 2016

(54) CORIOLIS FLOWMETER

(71) Applicant: Invensys Systems, Inc., Foxboro, MA (US)

(72) Inventor: Manus P. Henry, Oxford (GB)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 14/927,080

(22) Filed: Oct. 29, 2015

(51) Int. Cl.
 *G01F 7/00* (2006.01)
 *G01F 1/84* (2006.01)
(52) U.S. Cl.
 CPC .................................. *G01F 1/8472* (2013.01)
(58) Field of Classification Search
 CPC .............. G01F 1/84; G01F 1/00; G01F 17/00; G01F 7/00
 USPC .................. 73/861.355–861.357; 702/45, 50
 See application file for complete search history.

(56) References Cited

U.S. PATENT DOCUMENTS

| | | | |
|---|---|---|---|
| 7,509,219 B2 * | 3/2009 | Henry ................... | G01F 1/8486 702/50 |
| 7,784,360 B2 * | 8/2010 | Henry ...................... | G01F 1/74 73/861.356 |
| 8,442,781 B2 * | 5/2013 | Shimada ............... | G01F 1/8431 702/48 |

* cited by examiner

*Primary Examiner* — Jewel V Thompson
(74) *Attorney, Agent, or Firm* — Stephen Manetta; Ralph Graham

(57) ABSTRACT

A Coriolis flowmeter has a driver that oscillates a conduit, a first sensor configured to generate a first sensor signal indicative of movement of the conduit at a first location, and a second sensor configured to generate a second sensor signal indicative of movement of the conduit at a second location. The first and second locations are arranged so a phase difference between the first and second signals when the conduit is oscillated by the driver is related to a mass flow rate of the fluid through the flowmeter. A digital signal processor includes a plurality of detectors tuned to a set of different frequencies. The detectors are configured to analyze the first sensor signal in parallel and generate an output indicative of how closely an actual frequency of the first sensor signal matches the frequency to which the respective detector is tuned.

22 Claims, 38 Drawing Sheets

CORIOLIS FLOWMETER

FIELD OF INVENTION

The present invention relates generally to flowmeters and more specifically to Coriolis flowmeters.

BACKGROUND

Various different flowmeters are used in industry to provide information about the flow rate of multiphase fluids. The fluids that are metered can include mixtures of liquids and gases. This situation is commonly encountered in the oil and gas industry, where the fluids produced are commonly a mixture of oil, water, and gas. However, the need to meter multiphase fluids also occurs in other industries as well. Flowmeters are also important in applications that do not involve multiphase fluids.

One type of flowmeter is a Coriolis flowmeter. A Coriolis flowmeter includes an electronic transmitter and a vibratable flowtube through which fluid to be metered can be passed. The transmitter maintains flowtube vibration by sending a drive signal to one or more drivers and performs measurement calculations based on signals from a pair of sensors that measure movement of the flowtube. The physics of the device dictate that Coriolis forces act along a section of the flowtube between the sensors, resulting in a phase difference between the generally sinusoidal sensor signals. This phase difference is generally proportional to the mass flow rate of the fluid passing through the measurement section of the flowtube. Thus, the phase difference provides a basis for a mass flow measurement of fluid flowing through the flowtube. The frequency of oscillation of the flowtube of a Coriolis meter varies with the density of the process fluid in the flowtube. The frequency value can be extracted from the sensor signals so that the density of the fluid can also be obtained by analyzing the sensor signals.

Coriolis meters are widely used throughout various different industries. The direct measurement of mass flow is frequently preferred over volumetric-based metering, for whereas the density and/or volume of a material may vary with temperature and/or pressure, mass is unaffected. This is particularly important in the oil and gas industry, where energy content and hence product value is a function of mass. The term 'Net Oil' is used in the oil and gas industry to describe the oil flow rate within a three-phase or a liquid (oil/water) stream. A common objective in the oil and gas industry is to determine the net oil produced by each well in a plurality of wells because this information can be important when making decisions affecting production from an oil and gas field and/or for optimizing production from an oil and gas field.

The inclusion of gas in a liquid stream introduces errors in the mass flow and density measurements of a Coriolis meter. Laboratory trials can be used to characterize how mass flow rate and density errors relate to other parameters, such as the observed flow rate and observed reduction in density from that of the pure fluid. These trials can be used to develop empirical models that provide corrections to account for some of the error associated with the presence of multiphase fluids including gas and liquid phases. These empirically-based corrections can result in improved performance of Coriolis meters in field operations. Additional details concerning use of Coriolis meter to meter multiphase fluids are provided in U.S. Pat. Nos. 6,311,136; 6,505,519; 6,950,760; 7,059,199; 7,313,488; 7,617,055; and 8,892,371, the contents of which are hereby incorporated by reference.

In many conventional Coriolis meters the frequency of oscillation of the flowtube is calculated by measuring the time between zero crossings on the sensor signals. Fourier techniques are commonly used to calculate the amplitude and phase of the flowtube vibration. For example, FIG. 1 illustrates a quadrature technique that has been used in many conventional Coriolis meters. In this technique, the sensor signals are multiplied by a quadrature sine wave and also a quadrature cosine wave. The quadrature products are integrated over a cycle (the length of which is based on the frequency calculation) to yield $I_s$ for the integral obtained by integrating the sine product and $I_c$ for the integral obtained by integrating the cosine product. The phase of each sensor signal is calculated as the arctan of $(I_c/I_s)$. The amplitude of each sensor signal is calculated as the square root of $(I_s^2 + I_c^2)$. The calculated frequency and phase provide the basis for measuring density of the fluid and mass flow rate. As the density of the fluid increases, the frequency of the sensor signal will decrease. Also, the difference in the phase of the two sensor signals will increase as the mass flow rate increases. In some Coriolis meters, the calculated frequency, amplitude, and phase are further used to generate a synthesized drive signal that is used to drive oscillation of the flowtube.

Because the frequency of the flowtube changes (e.g., in response to changes in the density of the fluid flowing through the flowtube), the time between zero crossings and the calculated frequency also changes during operation of the meter. Consequently, conventional Coriolis meters update the values for the sine and cosine functions each new cycle, or in some cases every half cycle. For example, the values for the quadrature functions are commonly recalculated each half cycle using the new calculated frequency based on the latest zero crossings. Also, when the beginning and end of each cycle are constrained to be at zero crossings, as in the technique illustrated in FIG. 1, there are no updates to the frequency, amplitude, or phase at intermediate points between the zero crossings.

The present inventor has made various improvements, which will be described in detail below, applicable to the field of Coriolis flowmeters and applicable to the field of net oil and gas testing.

SUMMARY

One aspect of the invention is a Coriolis flowmeter having a conduit configured to convey a fluid through the flowmeter, a driver configured to oscillate the conduit, a first sensor configured to generate a first sensor signal indicative of movement of the conduit at a first location, a second sensor configured to generate a second sensor signal indicative of movement of the conduit at a second location. The first and second locations are arranged so a phase difference between the first and second signals when the conduit is oscillated by the driver is related to a mass flow rate of the fluid through the flowmeter. The Coriolis meter has a digital signal processor configured to detect the phase difference and determine the mass flow rate of the fluid using the detected phase difference and output a signal indicative of the determined mass flow rate. The digital signal processor includes a plurality of detectors tuned to a set of different frequencies. The detectors are configured to analyze the first sensor signal in parallel and generate an output indicative of how closely an actual frequency of the first sensor signal matches the frequency to which the respective detector is tuned.

Another aspect of the invention is a method of driving oscillation of a conduit of a Coriolis flowmeter of the type including a conduit configured to convey a fluid through the flowmeter, a driver configured to oscillate the conduit, a first sensor configured to generate a first sensor signal indicative of movement of the conduit at a first location, a second sensor configured to generate a second sensor signal indicative of movement of the conduit at a second location, the first and second locations being arranged so a phase difference between the first and second signals when the conduit is oscillated by the driver is related to a mass flow rate of the fluid through the flowmeter. The method includes using a plurality of detectors tuned to a set of different frequencies to analyze the first sensor signal in parallel and generate outputs indicative of how closely an actual frequency of the first sensor signal matches the frequency to which the respective detector is tuned. The driver is supplied with a drive signal including a frequency based on an estimated frequency determined using the outputs from the detectors.

Other objects and features will be in part apparent and in part pointed out hereinafter.

BRIEF DESCRIPTION OF THE DRAWINGS

Corresponding reference numbers indicate corresponding parts through the drawings.

DETAILED DESCRIPTION

Figure 1:
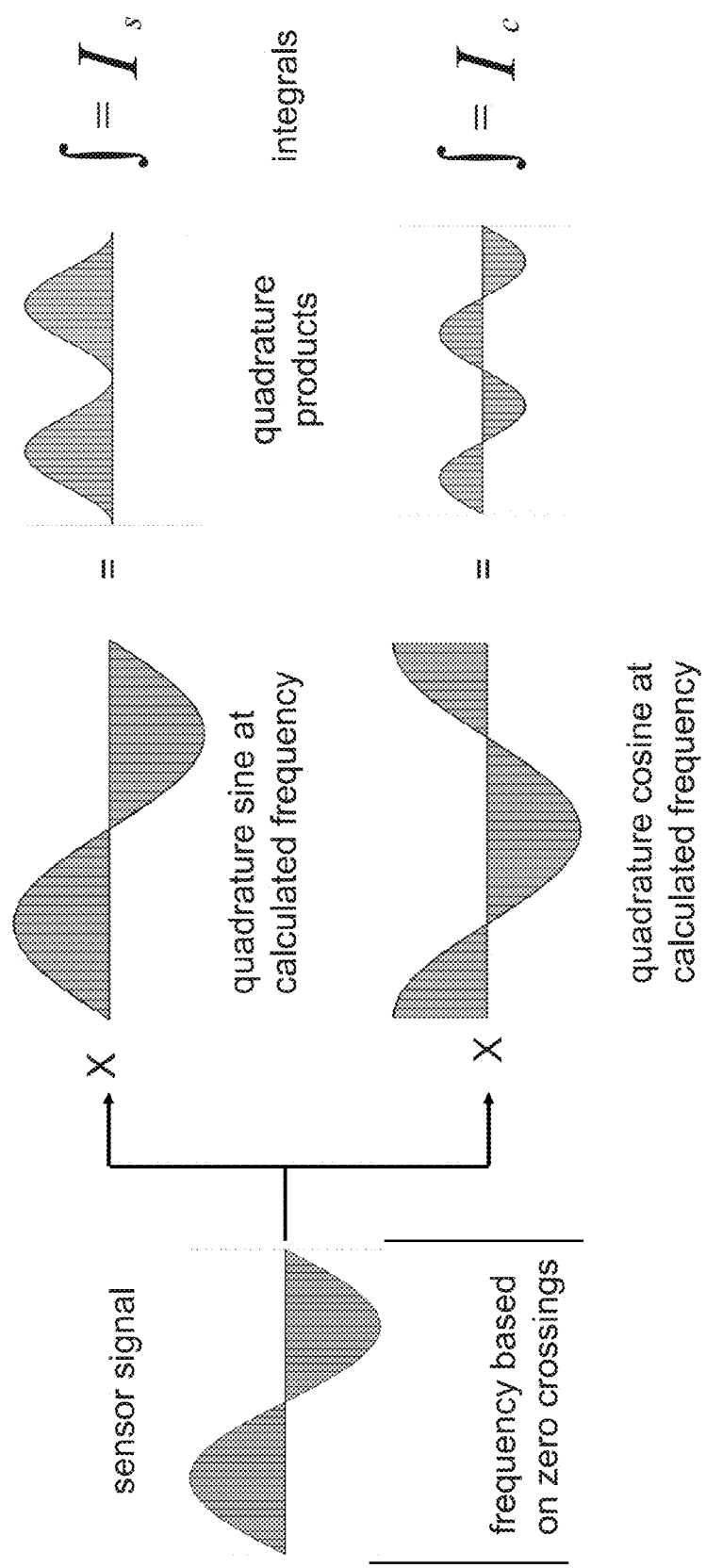
FIG. 1 is a schematic diagram illustrating a prior art technique for analyzing sensor signals in a Coriolis meter.
Figure 2:
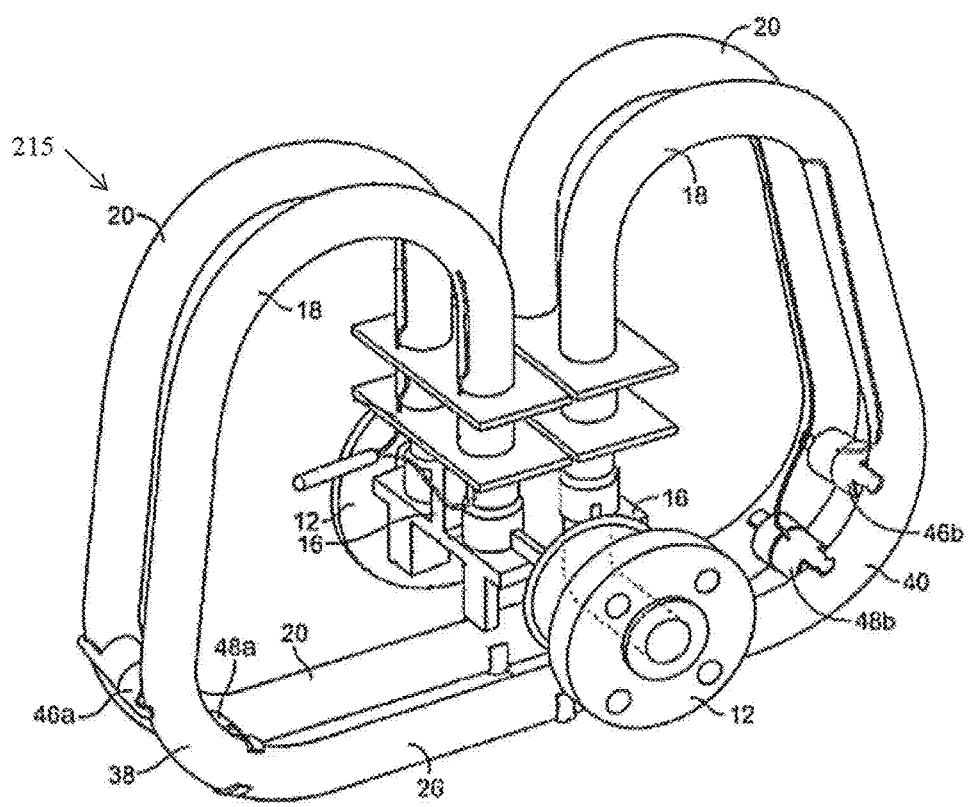
FIG. 2 is a perspective of one embodiment of a Coriolis flowmeter.
Figure 3:
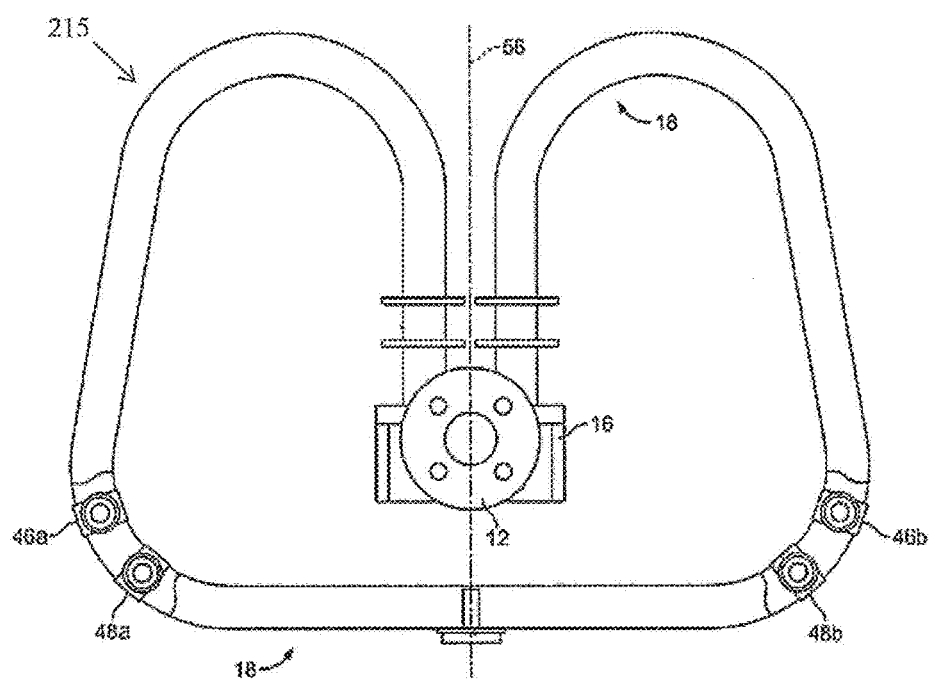
FIG. 3 is a side elevation of the Coriolis flowmeter shown in FIG. 2.

One embodiment of a Coriolis flowmeter, generally designated 215, is illustrated in FIGS. 2 and 3. The flowmeter 215 includes one or more conduits 18, 20 (also referred to as a flowtube), one or more drivers 46a, 46b for driving oscillation of the conduit(s), and a pair of motion sensors 48a, 48b that generate signals indicative of the oscillation of the conduit(s). In the illustrated embodiment, there are two conduits 18, 20 two drivers 46a, 46b and two motion sensors 48a, 48b and the drivers and motions sensors are positioned between the conduits so each driver and motion sensor is operable for both of the conduits. It is understood however that a Coriolis flowmeter may have only a single conduit and/or may have a single driver. It is also understood the conduit(s) may have different configurations than the conduits 18, 20 in the illustrated embodiment.

As illustrated in FIGS. 2 and 3, the flowmeter 215 is designed to be inserted in a pipeline (not shown) having a small section removed or reserved to make room for the flowmeter. The flowmeter 215 includes mounting flanges 12 for connection to the pipeline, and a central manifold block 16 supporting the two parallel planar conduit loops 18 and 20 which are oriented perpendicularly to the pipeline. The drivers 46a, 46b and sensors 48a, 48b are attached between each end of loops 18 and 20. The drivers 46a, 46b on opposite ends of the loops 18, 20 are energized by a digital controller (not shown) with current of equal magnitude but opposite sign (i.e., currents that are 180° out-of-phase) to cause straight sections 26 of the loops 18, 20 to rotate about their co-planar perpendicular bisector 56 (FIG. 2). Repeatedly reversing (e.g., controlling sinusoidally) the energizing current supplied to the drivers 46a, 46b causes each straight section 26 to undergo oscillatory motion that sweeps out a bow tie shape in the horizontal plane about the axis 56 of symmetry of the loops. The entire lateral excursion of the loops 18, 20 at the lower rounded turns 38 and 40 is small, on the order of 1/16 of an inch for a two foot long straight section 26 of a pipe having a one inch diameter. The frequency of oscillation is typically about 70 to 110 Hertz, although this can vary depending on the size and configuration of the flowtube(s).

The sensors 48a, 48b are positioned to detect movement of the flowtube at different locations on the flowtube and output sensor signals indicative of the detected movement. As will be understood by those skilled in the art, the Coriolis effect induces a phase difference between the two sensors 48a, 48b that is generally proportional to mass flow rate. Also, the resonant frequency of the loops 18, 20 will vary as a function of density of the fluid flowing therethrough. Thus, the mass flow rate and density can be measured by analyzing the signals from the sensors 48a, 48b. The Coriolis meter 215 has a processor 101 (FIG. 3) configured to receive the sensor signals from the sensors 48a, 48b, determine a phase difference between the sensor signals, and use the determined phase difference to determine a fluid flow rate through the flowtube. The processor 101 is also configured to determine a frequency of one or more of the sensor signals and use the determined frequency to determine a density of the fluid in the flowtube.

Various corrections can be applied to the basic measurements resulting from the phase difference between the signals from the sensors 48a, 48b and the frequency. For example, multiphase flow introduces highly variable damping on the flowtube, up to three orders of magnitude higher than in single phase conditions. In addition, the mass flow and density measurements generated under multiphase flow conditions are subject to large systematic and random errors, for which correction algorithms can be defined and implemented by the processor 101. Further details concerning operation of Coriolis flowmeters are provided in U.S. Pat. Nos. 6,311,136; 6,505,519; 6,950,760; 7,059,199; 7,188,534; 7,614,312; 7,660,681; and 7,617,055, the contents of which are hereby incorporated by reference.

Figure 4:
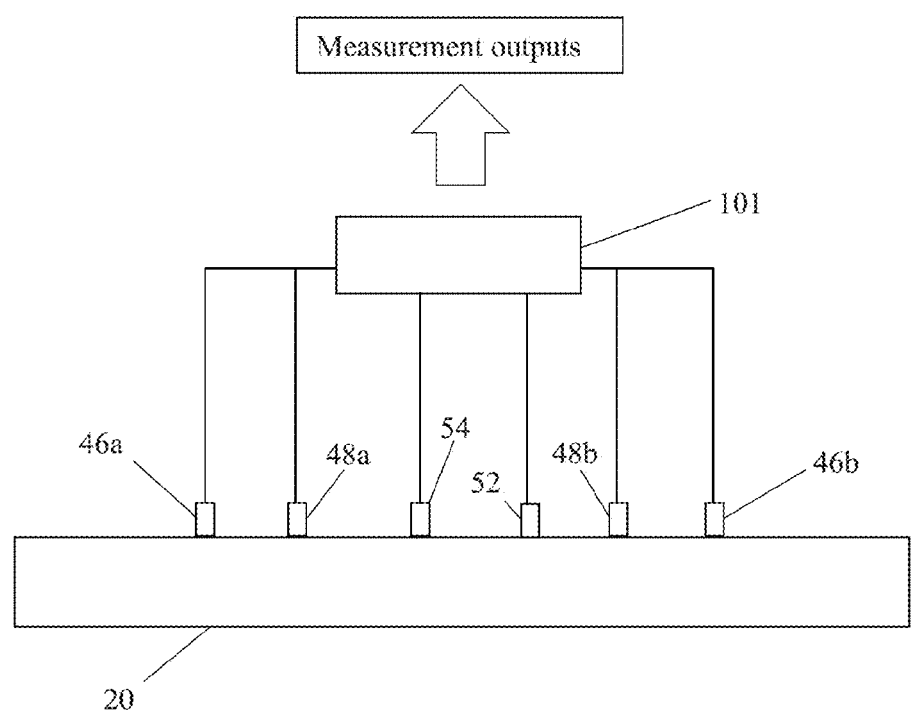
FIG. 4 is a schematic diagram of the Coriolis flowmeter.

Referring to FIG. 4 the processor 101 of the Coriolis flowmeter 215 is suitably a transmitter that is configured to receive signals from the sensors 48a, 48b and in some case other instruments (e.g., a pressure and/or temperature sensor), use the received signals to determine mass flow rate and/or density of the fluid in the flowtube as well as generate suitable drive signals for the drivers 46a, 46b, and output measurement and diagnostic information (e.g., to a distributed control system). As will be explained in more detail below, the transmitter 101 suitably processes the sensor signals in a manner that is different from conventional Coriolis meters.

The transmitter 101 suitably includes inputs for receiving analog signals from the sensors 48a, 48b, a pressure sensor 54 positioned to measure line pressure of the fluid, and a temperature sensor 52 positioned to measure the temperature of the fluid. The transmitter 101 suitably converts the analog signals, including specifically the analog signals from the sensors 48a, 48b to digital signals. Various combinations of hardware and software can be used to digitize the signals. For example, a field programmable gate array (FPGA) is suitably used to digitize the samples. Suitable FPGAs having the speed and power required to perform the techniques described herein are commercially available from Xilinx Inc., such as the Zynq 7010, Zynq 7015, Zynq 7020, Zynq 7030, Zynq 7035, Zynq 7045, or Zynq 7100, all of which are system-on-a-chip (SoC) devices that combine an FPGA with additional integrated circuits that provide additional processing power on the same chip. Although the precise specifications may vary within the scope of the invention, typical characteristics of these SoCs include ARM® Dual Core Cortex, 866 MHz to 1 GHz, 1066 to 1333 Mb/s DDR3, 28 k to 444 k LC FPGA fabric, 80 to 2020 DSP slices, and 6.25 to 12.5 GB/s transceivers. It is noted that although the Zynq products listed above use ARM® architecture, it is possible to use other architectures without departing from the scope of the invention. Likewise, the product specifications can vary from those listed above without departing from the scope of the invention.

Figure 5:
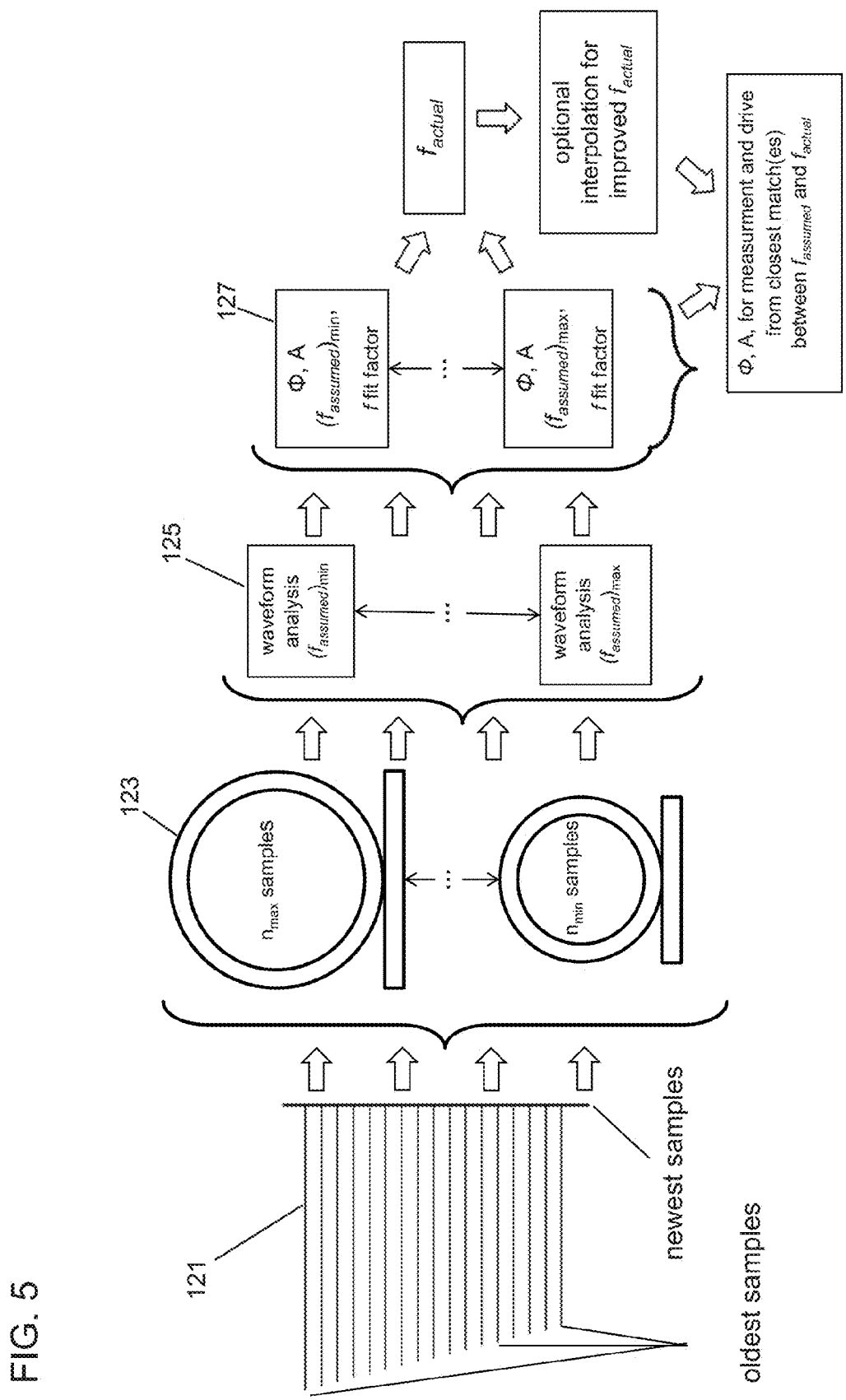
FIG. 5 is a schematic diagram illustrating a detector bank for processing a signal from one or more of the sensors of the Coriolis meter.

As illustrated in FIG. 5, the processor 101 includes a plurality of detectors 121 (sometimes referred to as a detector bank) configured to analyze one of the sensor signals in parallel using a set of assumed frequencies that include a plurality of frequencies that are different from one another. The assumed frequencies are suitably selected to fall within a range of frequencies corresponding to the highest and lowest expected frequencies of the primary bending mode of flowtube oscillation. The frequency range of various vibrational modes of the flowtube will vary depending on physical attributes of the flowtube. To provide just one example, a suitable frequency range for the frequencies in the set of assumed frequencies is about 70 Hz to about 110 Hz, which is a range covering all of the expected frequencies of the driven mode of the Coriolis meter illustrated in FIGS. 2 and 3.

The detectors 121 can take various forms within the broad scope of the invention. In the embodiment illustrated in FIG. 5, for example, a suitable detector 121 generally includes a buffer 123, a waveform analyzer 125 that analyzes the signal using a tuned frequency, and a frequency fit evaluator 127 that assess how close the tuned frequency is to the actual frequency and outputs a fitness factor that is used to pick one or more detectors having assumed frequencies that are close to the current actual frequency.

The buffer 123 suitably includes a circular buffer configured to store the most recent n samples from the sensor signal. The number of samples n stored in the circular buffer 123 varies as a function of the tuned frequency and the sampling rate. For example, the length of the sample string stored in the circular buffer suitably corresponds to length of one cycle at the tuned frequency, in which case n is equal to the sampling rate divided by the tuned frequency for the respective detector. Thus, the size of each buffer 123 expressed as the number of digital samples that can be stored therein is suitably selected to tune the respective detector to a particular tuned frequency. Using the example from above in which the assumed frequencies are in the range of about 70 Hz to about 110 Hz in combination with a sampling rate of about 49.9 kHz, the circular buffers 123 are configured to hold between 714 samples (70 Hz) and 454 samples (110 Hz). For example, the detectors 121 can suitably include a detector having a circular buffer 123 that holds every possible integer number of samples between the number of samples for the shortest sample string (corresponding to the highest frequency in the frequency range) and the longest sample string (corresponding to the lowest frequency in the frequency range). In the example above, this corresponds to 260 different detectors 121 having circular buffers 123 configured to store sample strings having every integer value between 454 and 714. A large number of detectors 121 operating at many different assumed frequencies that are closely spaced to one another may be desirable from the standpoint of accuracy, but it is understood that fewer detectors can be used within the scope of the invention (e.g., the number of samples that can be stored in each circular buffer 123 may increase by n+2, n+3, n+4, and so on) if preferred.

The detectors 121 suitably include a waveform analyzer 125 that calculates the phase and amplitude of the sensor signal using the tuned frequency. The waveform analyzers 125 suitably use a quadrature technique to calculate the phase and amplitude. For example, the waveform analyzers 125 suitably multiply the sensor signal by quadrature functions generated at the tuned frequency, obtain $I_s$ and $I_c$ integrals by integrating the products, and use the equations $\Phi$=arctan of ($I_c/I_s$) to calculate the phase ($\Phi$) and A=square root of ($I_s^2+I_c^2$) to calculate the amplitude (A). The tuned frequency of each detector 121 is static during operation of the meter 215. Accordingly, the waveform analyzer 125 for each particular detector 121 is suitably configured to use static sine and cosine values for the quadrature functions. For example, the sine and cosine values used by each detector 121 can be stored in a lookup table. The waveform analyzers 125 suitably avoid generating new values for the quadrature functions during operation of the meter 215.

The detectors 121 are configured to analyze the sensor signal based on an assumption that the tuned frequency is the actual frequency of the sensor signal. The detectors 121 operate continuously even when the frequency of flowtube oscillation is substantially different from the tuned frequency for the respective detector. Thus, the amplitude and phase calculated by some or even most of the detectors 121 will be of minimal to no value because of the large difference between the tuned frequency for that detector and the actual frequency. However, one or more of the detectors 121 will have a tuned frequency that is relatively close to the actual frequency of the sensor signal.

The detectors are configured to assess how close their tuned frequency is to the actual frequency of the sensor signal based on an analysis of a waveform of the first sensor signal represented by the digital samples stored in the buffer. The closeness, which may be expressed as a frequency fit factor, is suitably output by the detector for use by the processor in identifying one or more detectors for which the tuned frequency is close to the actual frequency. Alternatively, the processor may evaluate the detectors and calculate the frequency fit factor for each detector within the scope of the invention. There are various ways to detect how close the tuned frequency of a detector is to the actual frequency. For example, the detectors are suitably configured to use a difference between phase calculations at different times to assess how close the tuned frequency is to the current actual frequency. When the tuned frequency of a particular waveform analyzer is close to the actual frequency of the sensor signal, the phase calculated previously at the time the oldest sample in the circular buffer was the newest sample will be about equal to the phase calculated after the newest sample was added to the buffer. The detectors are suitably configured to store previous phase calculations so they can be compared to more recent phase calculations. In general, the detectors are configured to assess how close the assumed frequencies are to the current actual frequency by comparing one or more stored phase values (e.g., phase values from a full cycle ago, half cycle ago, quarter cycle ago, or multiples thereof) to corresponding expected phase values that would exist if the tuned frequency equals the actual frequency. In general, the previous phase estimate corresponds to a time t at which there is an expected relation between the current phase estimate and the previous phase estimate, wherein the expected relation is based on a relation between t and the period of an ideal waveform having the frequency to which the detector is tuned, and the analysis comprises comparing an actual relation between the current phase estimate and the previous phase estimate to the expected relation between the current phase estimate and the previous phase estimate.

Figure 6:
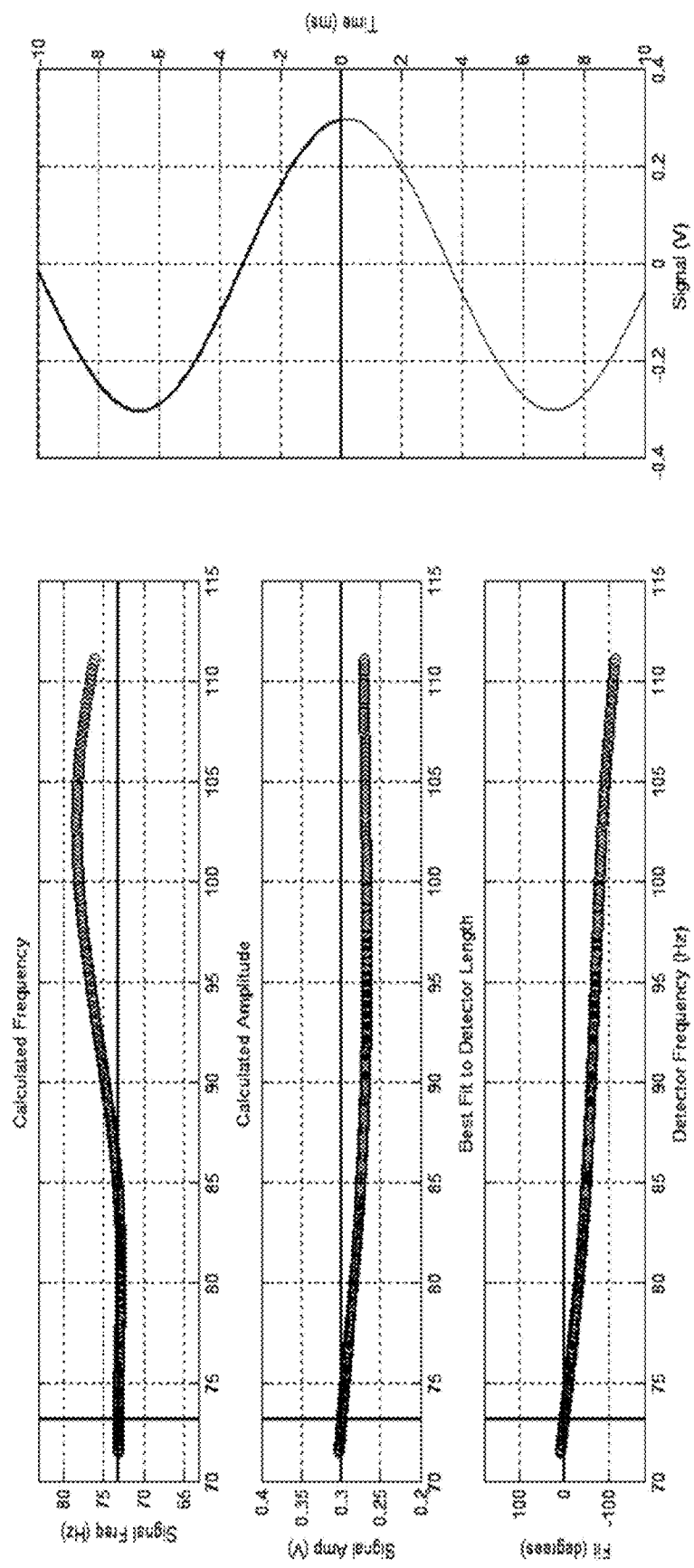
FIGS. 6 and 7 are graphs showing frequency and amplitude estimates, along with a frequency fit factor, for each detector in a detector bank analyzing signals at 73.2 Hz and 82.56 Hz, respectively.
Figure 7:
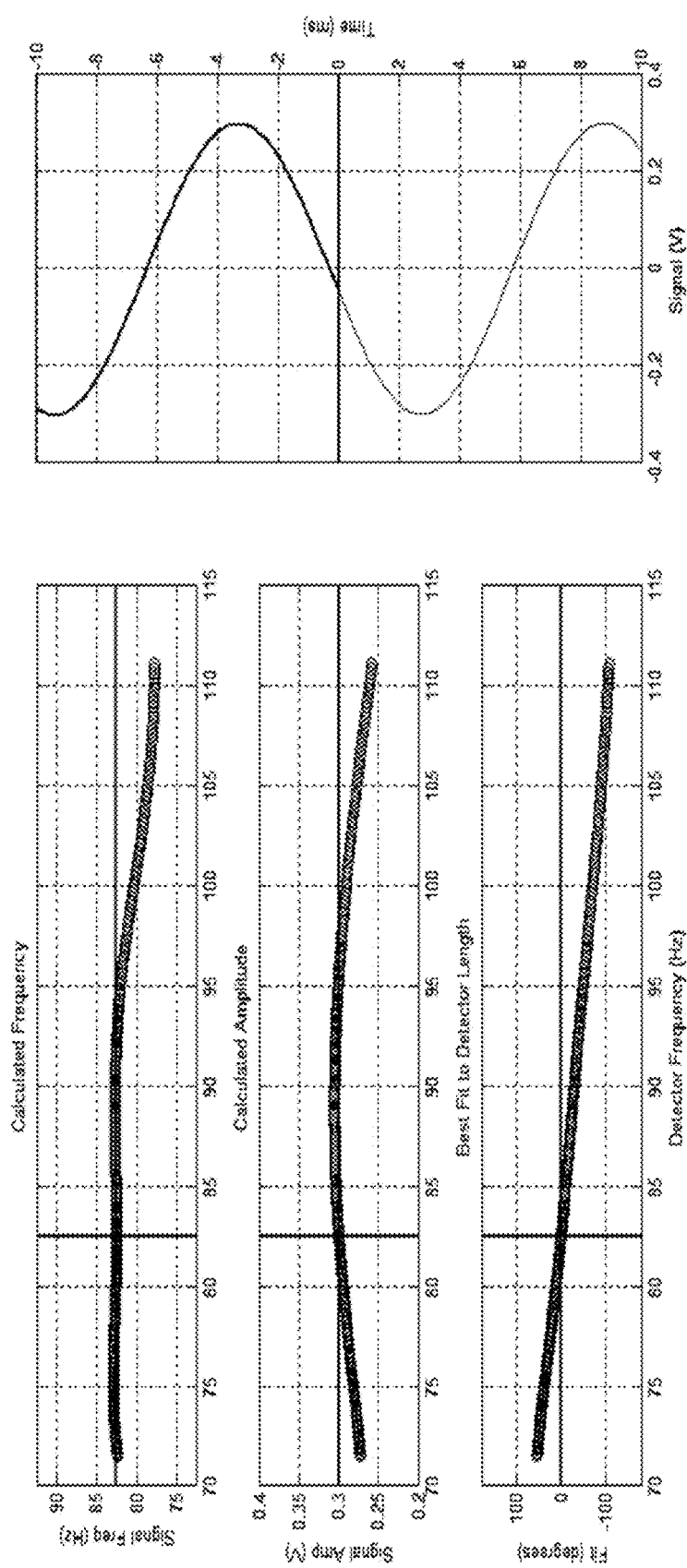

FIGS. 6 and 7 further illustrate operation of the detectors 121. FIG. 6 illustrates operation of the detectors 121 when they are used to process a signal having a frequency of 73.2 Hz and an amplitude of 0.3 V. Each of the detectors calculates a frequency (upper graph), amplitude (middle graph) and, frequency fit factor (lower graph), which in this case is the difference between the current phase value and the stored phase value from when the oldest sample in the buffer 123 was the newest sample in the buffer. Several of the detectors 121 (e.g., those tuned to between about 100 Hz and 105 Hz) produce frequency estimates that deviate substantially from the actual frequency of 73.2 Hz. Several other detectors 121 (e.g., those tuned to below about 87.5 Hz, and especially those tuned to about 85 Hz and also those tuned to less than about 75 Hz) produce frequency estimates that are fairly close to the actual frequency. However, detectors 121 tuned to about 73.2 Hz produce estimated frequencies (based on calculations of the waveform analyzer) that are close to the frequency to which they are tuned. Also, as illustrated in the middle graph, only those detectors tuned to about 73.2 Hz produced an amplitude estimate that was close to the actual amplitude of 0.3 V. Further, the frequency fit factor (i.e., the difference between the current phase value and the stored phase value from one cycle ago at the tuned frequency) is best (in this case closest to zero) for the detector 121 that is tuned to about 72.3 Hz. Thus, the output from the waveform analyzer 123 of the detector 121 having the best fit factor is a good estimate of the actual frequency, phase, and amplitude of the signal. Another factor that can be used by the processor 101 to identify the best detectors 121 is that the calculated frequencies produced by the best detectors are close to the frequencies to which the detectors are tuned. Also, FIGS. 6 and 7 show the frequency detector outputs at just one instant in time. It is possible that some of the detectors that are not close to the actual frequency may temporarily appear to produce outputs that have low error (see e.g., the frequency detectors at about 85 Hz for the frequency calculation in FIG. 6). However, for frequency detectors that are not close to the actual frequency, the outputs can vary in a relatively short amount of time. In contrast, the error level for detectors that are close to the actual frequency will generally be more stable over time than those that are not close to the actual frequency, while also being low in magnitude. This characteristic can also be included in the criteria for selecting frequency detectors that are close to the actual frequency and/or as a cross-check to confirm suitable frequency detectors are being selected as the frequency detectors that are close to the actual frequency.

FIG. 7 is similar except the frequency of the signal has been changed to 82.56 Hz. Here again, the frequency detectors 121 having the best fit factors (e.g., those tuned to about 82.56 Hz) provide accurate estimates for signal amplitude and accurate frequency calculations. Moreover, the calculated frequencies from the detectors tuned to about 82.56 Hz are about equal to the frequencies to which those detectors again. Thus, the fit factor provides a basis to identify detectors that are tuned to frequencies that are close to the actual frequency of the signal.

The processor 101 suitably uses the calculated phase and amplitude, as well as the tuned frequency, from one or more detectors 121 that are tuned to frequencies close to the actual frequency (e.g., based on the frequency fitness factor and other criteria described above) to determine the frequency, phase, and amplitude of the actual sensor signal. If desired, the processor 101 can suitably be configured to pick the detector 121 tuned to a frequency that is closest to the current actual frequency (e.g., by identifying the detector for which the difference between the current phase calculation and the stored phase calculation from the time the oldest sample in the buffer was the newest sample in the buffer is the closest to zero) and use the tuned frequency, along with the phase and amplitude calculated by the closest detector, as the best measure of the frequency, phase, and amplitude.

However, the actual frequency will most commonly be between two of the assumed frequencies. Only rarely will there be a really close match between any of the assumed frequencies and the actual frequency. Moreover, as the actual frequency changes there will necessarily be times when the actual frequency is midway between the two closest assumed frequencies. Thus, the processor is suitably configured to use interpolation (e.g., quadratic interpolation) to improve the values obtained for the frequency, phase, and amplitude of the sensor signal. This can be used to reduce the amplitude error from about $10^{-3}$ V to about $10^{-6}$ V.

The values obtained by the processor 101 for the frequency, phase, and amplitude from the best fit detectors 121 are suitably used to measure the density and/or mass flow rate of fluid flowing through the meter. These values for frequency, phase, and amplitude are also suitably used to generate a drive signal supplied to one or more of the drivers 46a, 46b to oscillate the conduit.

The processing techniques described herein provide several different advantages compared to convention Coriolis meters. In contrast to conventional Coriolis meter frequency tracking, the flowmeter 215 described herein does not rely on zero crossings to track frequency. This improves frequency tracking and accuracy of the flowmeter 215 for at least several reasons. The portion of the sensor signal adjacent a zero crossing is less accurate that other portions of the sensor signal because low amplitude data points are more susceptible to noise, especially during multiphase flow. Also, the conventional reliance on zero crossings uses only a small portion of the sensor signal to track frequency. Moreover, the quadrature functions used to determine amplitude and phase of the sensor signals are based on the estimated frequency so errors in the estimated frequency cause errors in the amplitude and phase determinations.

Another limitation of the conventional zero crossing technique is that there can be no more than two measurements per cycle because of the need to wait for a zero crossing. In the case of a 100 Hz sensor signal, this means there is a need to wait 5 ms for each update. This can be a significant delay, especially during multiphase flow.

In contrast to the conventional zero crossing techniques, the processing techniques described herein for the Coriolis meter 215 makes use of the higher-amplitude portions of the sensor signal in addition to the lower-amplitude portions of the sensor signal to track the frequency. Thus, the frequency tracking by the Coriolis meter 215 is less susceptible to noise. Also, it is not necessary to wait for a zero crossing to perform an update. Instead, updates can be performed multiple times during each half-cycle. If desired, updates can be performed with each new incoming digital sample. Thus, it is possible to perform several hundred updates per cycle. The ability to perform updates at this rate allows much better frequency tracking, especially during multiphase flow.

The description above illustrates how to use a single bank of detectors 121 to process the first sensor signal. The same bank of detectors 121 can also be configured to process the second sensor signal in the same way. Likewise, the same bank of detectors 121 can also be used to process a third signal based on the first and second sensor signals (e.g., a weighted sum of the first and second sensor signals, a difference between the first and second sensor signals, and/or other combinations of the first and second sensor signals) in the same way. It can be desirable in some cases to obtain a single frequency estimate using only one of the available signals and then uses this frequency to calculate the amplitude and phase of the signals. For example, it can be desirable to use the frequency estimate obtained from the combined sensor signal as the frequency estimate and base the amplitude and phase calculations for the first and second sensor signals on that frequency. Signals based on a combination of the first and second sensor signals can provide the best estimate of frequency because of reduced noise in the combined signal. The circular buffers 123 suitably store all of the signals to be analyzed by the detector bank 121 and the signals are analyzed in parallel by the detector bank. The processor is configured to use the at least one of the frequency estimates (e.g., best frequency based on analysis of the combined sensor signal) to determine the density of the fluid flowing through the conduit. Likewise, the processor is suitably configured to use the phase data from the first and second sensor signals to determine a phase difference and a mass flow rate through the conduit based on the phase difference.

Alternatively, the Coriolis meter 215 suitably includes one or more additional detector banks, suitably substantially identical to the detector bank described above. The additional detector banks are used to process the second sensor signal and combined sensor signal in substantially the same way, as described above. The processor 101 is suitably configured to use one or more of the frequency values from the detector banks to determine the density of the fluid flowing through the conduit. Likewise, the processor 101 is suitably configured to use the phase data from the first and second sensor signals to determine the mass flow rate of fluid through the conduit.

Driving the Conduit in Two Modes at Same Time

Figure 8:
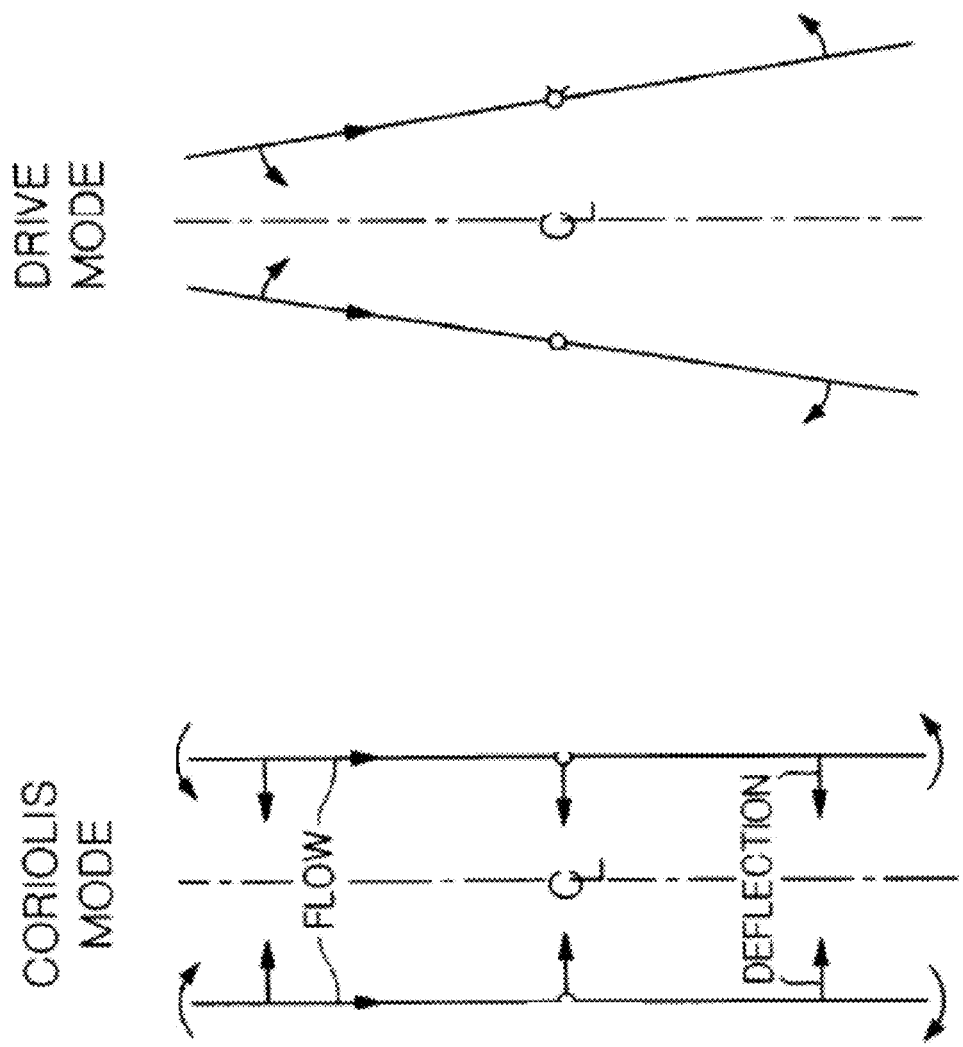
FIG. 8 is a schematic diagram illustrating one embodiment of oscillation of the conduits of the Coriolis meter in two different bending modes.

The Coriolis meter 215 is optionally configured to drive the conduit 18, 20 in two different modes at the same time. Conventional Coriolis meters oscillate their conduits in two different bending modes during operation. Referring to FIG. 8 in a traditional Coriolis meter, the conduit is driven to oscillate in one mode (commonly referred to as the "driven mode") and the forces associated with the Coriolis effect as fluid flows through the oscillating Conduit excite a secondary oscillation in a different bending mode (commonly referred to as the "Coriolis mode"). It is recognized that the detector bank processing described above could be used to drive the conduits 18, 20 to oscillate in both bending modes at the same time. This may be desirable to exert greater control over the oscillation of the conduit 18, 20, which can result in better tacking of the drive signals during difficult operating conditions, such as during multi-phase flow, and more accurate measurements.

Figure 9:
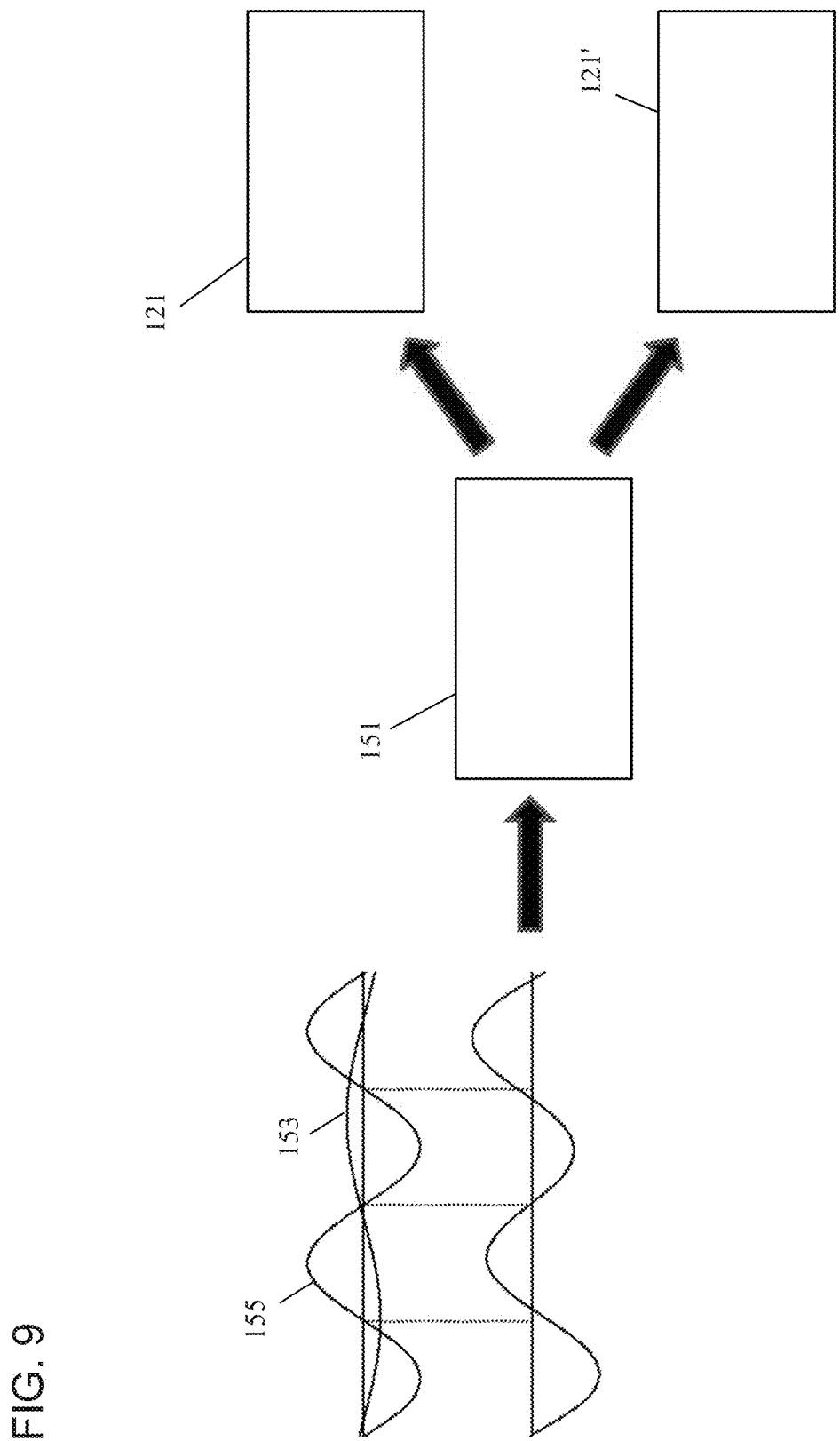
FIG. 9 is a schematic diagram illustrating one embodiment of a processor that separates the frequency content of a first bending mode from the frequency content of a second bending mode.

As illustrated schematically in FIG. 9, the processor 101 suitably includes one or more filters 151 configured to separate the frequency content 153 of the sensor signal at the first bending mode (e.g., the traditional driven mode) from the frequency content of the sensor signal at the second bending mode 155 (e.g., what is traditionally referred to as the Coriolis mode). The portion of the signal containing the frequency of the "driven mode" is processed by a detector bank 121 substantially as indicated above. The processor 101 includes a second detector bank 121' that is configured to process the portion of the signal containing the "Coriolis mode." The detector bank 121' for the Coriolis mode can be substantially identical to the detector bank described above except that the frequency range of the second detector 121' bank may need to be adjusted (e.g., by selecting circular buffers having different sizes) to optimize the second detector bank for the different frequency content of the Coriolis mode.

The processor 101 suitably uses the frequency, phase, and amplitude values obtained from the first and second detector banks 121, 121' to determine the mass flow rate and density of fluid flowing through the conduit. The additional information about the frequency, phase, and amplitude of the oscillation at the "Coriolis mode" can provide additional inputs (e.g., for neural networks or empirical models) that may yield more accurate density and mass flow measurements.

Alternatively, it may be possible to compute additional mass flow rate and/or density measurements directly from the frequency, phase, and/or amplitude values obtained from the detector bank that analyzes the "Coriolis mode" frequency content and average or otherwise combine these measurements with other measurements to achieve improved results. For example, just as forces associated with the Coriolis effect distort the oscillation in the driven mode to produce a phase difference, there will also be forces associated with the Coriolis effect that can distort the oscillation in the Coriolis mode that produces a second phase difference. The processor is suitably configured to detect the phase difference associated with the "driven mode" and the phase difference associated with the "Coriolis mode" and to use both phase differences to determine the mass flow rate.

Figure 10:
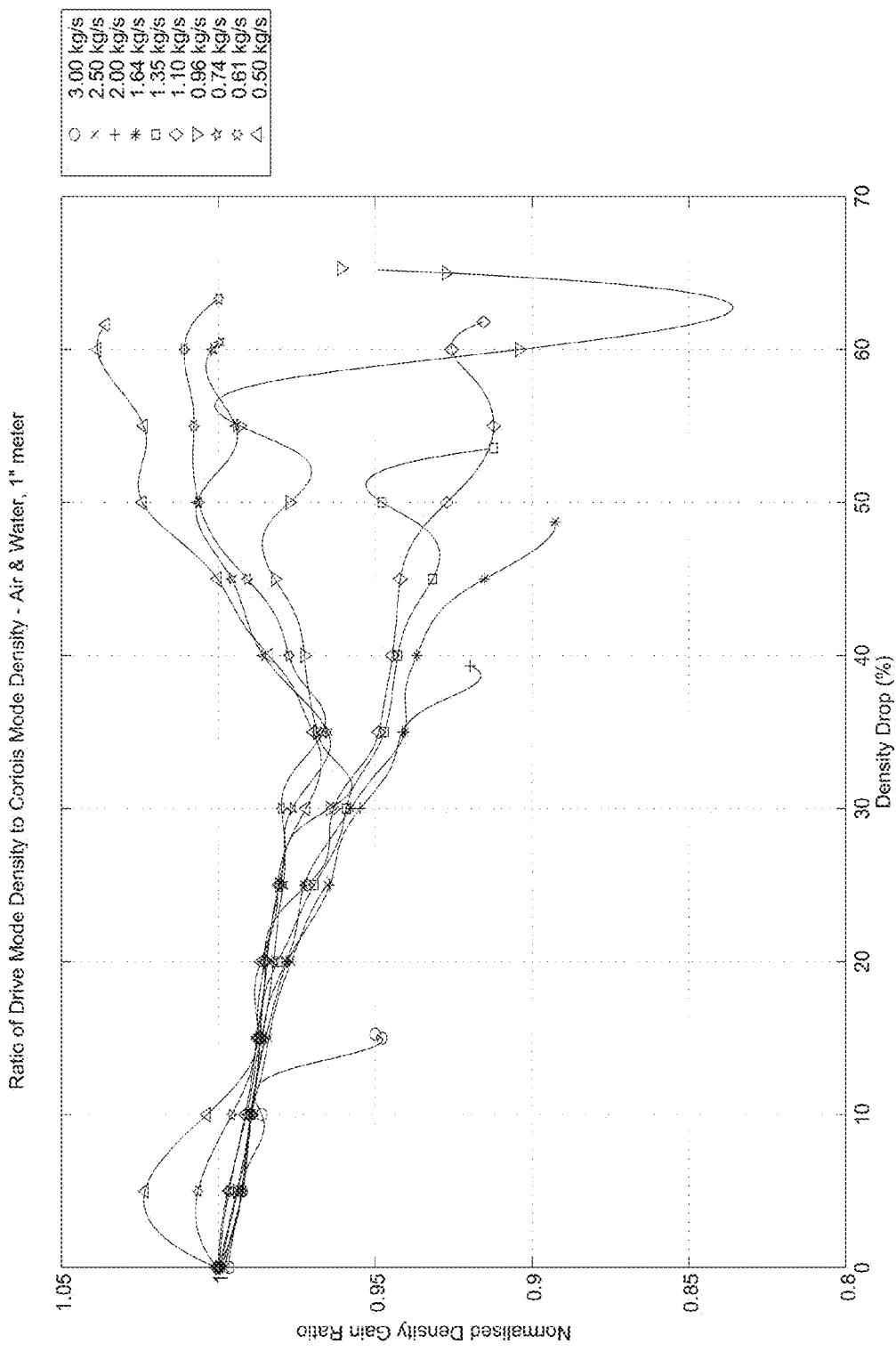
FIG. 10 is a graph illustrating a relationship between a ratio of drive mode density measurements to Coriolis mode density measurements and density drop.

FIG. 10 is a graph illustrating the ratio of a density calculated using the "driven mode" frequency, as described above, to the density calculated using the "Coriolis mode" frequency, also as described above, as a function of the density drop (which can be associated with onset of two-phase flow) at various flow rates ranging from 0.5 kg/s to 3.0 kg/s. There is a substantially linear relationship in this ratio from about 0 to about 30 percent density drop and especially from about 0 to about 20 percent density drop. This indicates that the ratio of the drive mode density to the Coriolis mode density can be correlated with the onset of two-phase flow. This provides just one example of how the processor 101 can use measurements from the "driven mode" in combination with measurements from the "Coriolis mode" to derive relationships that can improve accuracy and other performance criteria.

The processor 101 also suitably has a drive signal generator configured to output a drive signal to one or more drivers 46s, 46b that includes a first component 153 selected to drive oscillation of the conduit at the first frequency (e.g., at the frequency of the "driven mode") and a second component 155 selected to drive oscillation of the conduit at the second frequency (e.g., at the frequency of the "Coriolis mode"). Moreover, the drive signal generator is suitably configured to combine the first and second components concurrently with one another so the driver(s) drive(s) the conduit in the first bending mode (e.g., "driven mode") and in the second bending mode (e.g., Coriolis mode) at the same time. For example, the Coriolis meter 215 described herein has two drivers 46a, 46, and the drive signal generator is suitably configured to supply a dual mode drive signal to each of the drivers. For the driven mode in the case of a Coriolis meter having two drivers, the drive signals need to be out-of-phase with one another. However, for driving in the so-called Coriolis mode, the drive signals should be in phase. Thus, using d1 to refer the component of the drive signal that corresponds to the driven mode and d2 to refer to the part of the drive signal corresponding to the Coriolis mode, the processor 101 is suitably configured to supply one of the drivers with a signal comprising d1+d2 and to supply the other driver with a signal comprising −d1+d2. Alternatively, a dual mode drive signal may be supplied to just one of the two drivers without departing from the scope of the invention. Also, a Coriolis meter having only a single driver may be driven in two bending modes at the same time using the techniques described herein.

Because the Coriolis meter 215 drives the conduit 18, 20 in the "driven mode" and also in the "Coriolis mode," the motion of the conduit can be more precisely controlled, especially during difficult operating conditions. The processor 101 suitably controls the amplitude of the oscillations in both bending modes at the same time. For example, the drive signal is suitably adjusted to control the amplitude of the conduit 18, 20 in the first and second vibrational bending modes using a PID control. A suitable PID control has two inputs (one for amplitude of oscillation in each bending mode) and two outputs (one for drive level for each bending mode). The PID control suitably selects drive levels to maintain the amplitudes of oscillation in the two different bending modes at respective setpoints. The drive levels can be adjusted independently of one another as may be necessary to maintain the oscillation in each bending mode at its desired level.

Measurements Based on Time Correlation Between Two Meters

Figure 11:
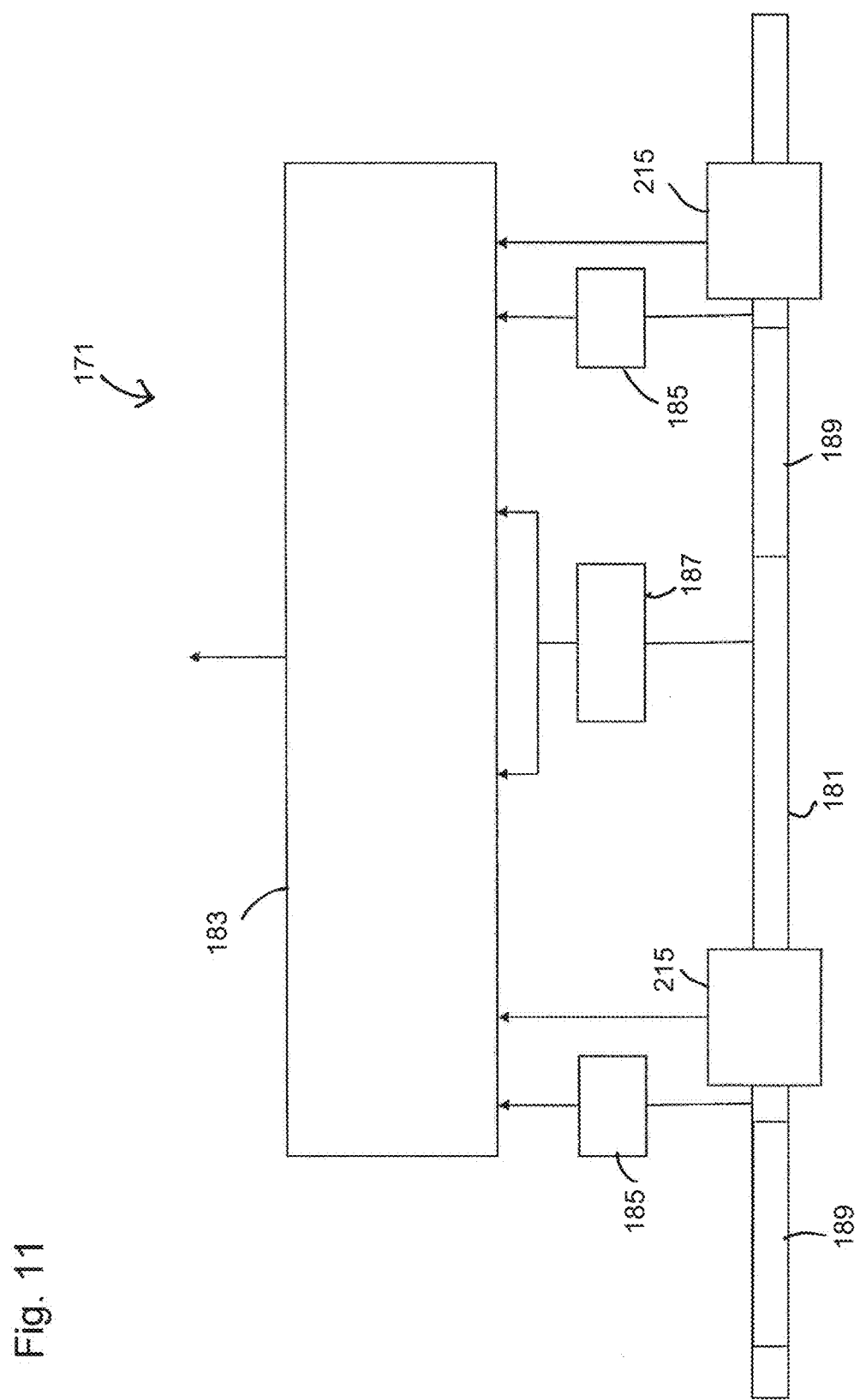
FIG. 11 is a schematic diagram of one embodiment of a system that uses a time correlation technique to improve measurements during two phase flow.
Figure 12:
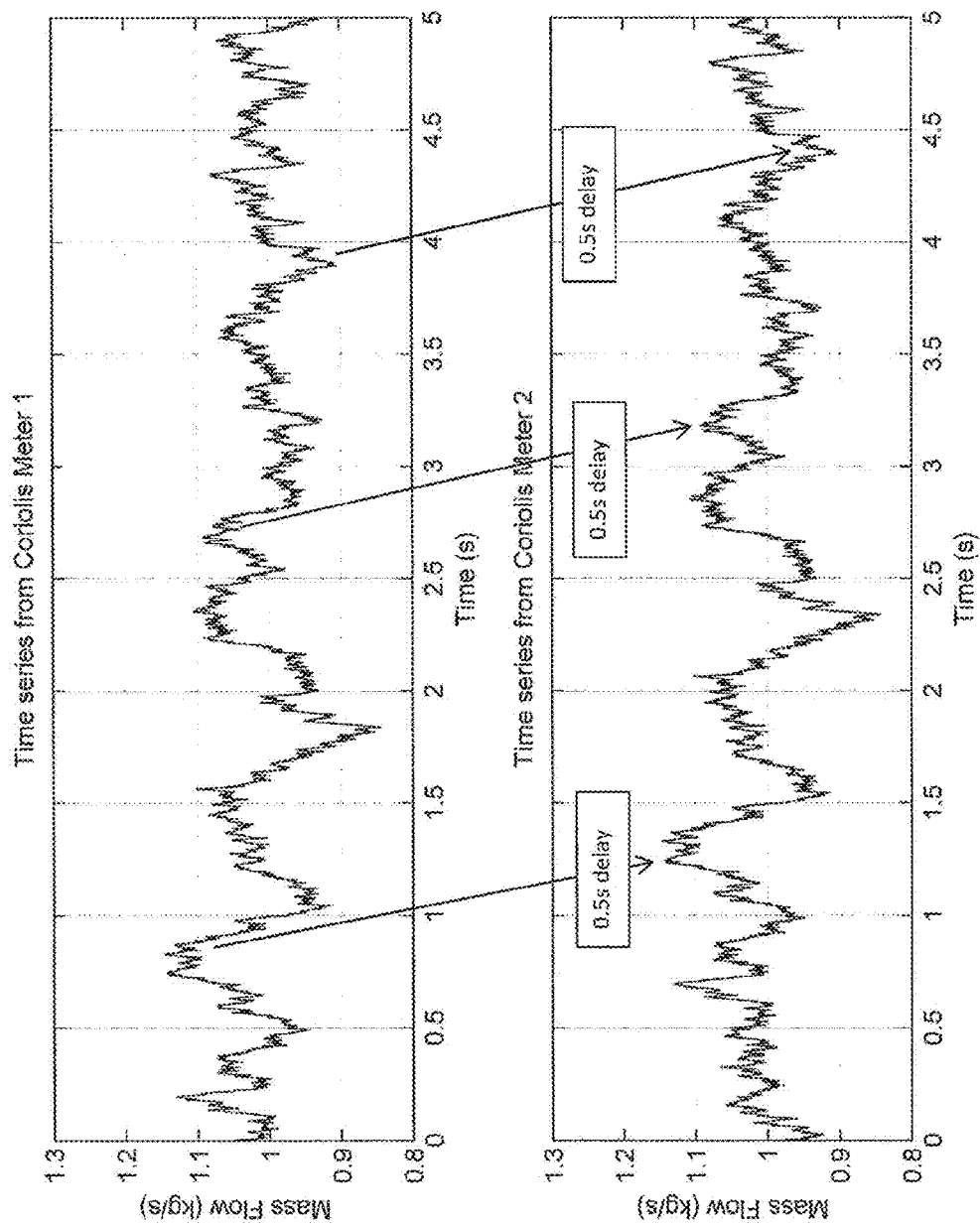
FIG. 12 is a graph illustrating a 0.5 s delay in the mass flow rate measurements from meters in the system of FIG. 11.

The Coriolis meter 215 described above, or one like it, can be combined with another Coriolis meter 215' to produce a system 171 for metering flow of a multiphase fluid based on a time correlation between measurements of the two Coriolis meters. As illustrated in FIG. 11, first and second Coriolis meters 215, 215' which in this embodiment are substantially identical to one another and to the Coriolis meter 215 described above are installed at different locations in the same pipeline 181. Each of the Coriolis meters 215, 215' outputs a time-varying mass flow rate measurement of fluid flowing through the respective meter and a time-varying density measurement of fluid flowing through the respective meter. A processor 183 suitably includes a correlator that compares at least one of the time-varying mass flow rate measurements and the time-varying density measurements from the first Coriolis meter 215 with the respective time-varying mass flow rate or time-varying density measurements from the second Coriolis meter 215' and determines a time delay between corresponding measurements. For example, FIG. 12 shows a 0.5 s delay in corresponding parts of the time-varying mass flow rate measurements from the meters 215, 215'. The processor 183 uses the determined time delay to derive an estimated velocity of a component of the multiphase flow in the pipe 181.

The measurement system 171 corrects at least one of the mass flow rate and density measurements using the estimated velocity. For example, the system 171 suitably uses the estimated velocity to characterize slip between a gas phase and a liquid phase of the multiphase fluid and to correct the mass flow and/or density measurement as a function of the slip. In general, the delay associated with mass flow rate measurements is related to the liquid phase velocity while the delay associated with density measurements is associated with gas phase velocity. The liquid phase velocity estimate can be used to correct the mass flow rate and/or the density measurement. The gas phase velocity can also be used to correct the mass flow rate and/or the density measurements. If desired the liquid phase velocity estimates and the gas phase velocity estimates can be used in combination to provide corrections for the mass flow rate and/or density measurements. The corrections can be derived in many ways, including through use of neural networks and/or empirical models. As illustrated in FIG. 11, the system 171 suitably uses additional information including pressure and temperature measurements from sets 185 of pressure and temperature sensors and other sensors 187 as inputs to determine the corrections. Also, it can be beneficial to ensure good mixing of the two phase flow as the fluid enters the meters 215, 215'. Thus, the system 171 illustrated in FIG. 11 includes a flow conditioner 189 adjacent and upstream from each meter 215, 215'.

The following examples involve illustrations of how the Coriolis meter 215, and in particular the processor 101, operates using various simulated signals. The examples illustrate robust performance under various conditions. The examples also illustrate how various corrections can be implemented to improve performance.

Figure 13:
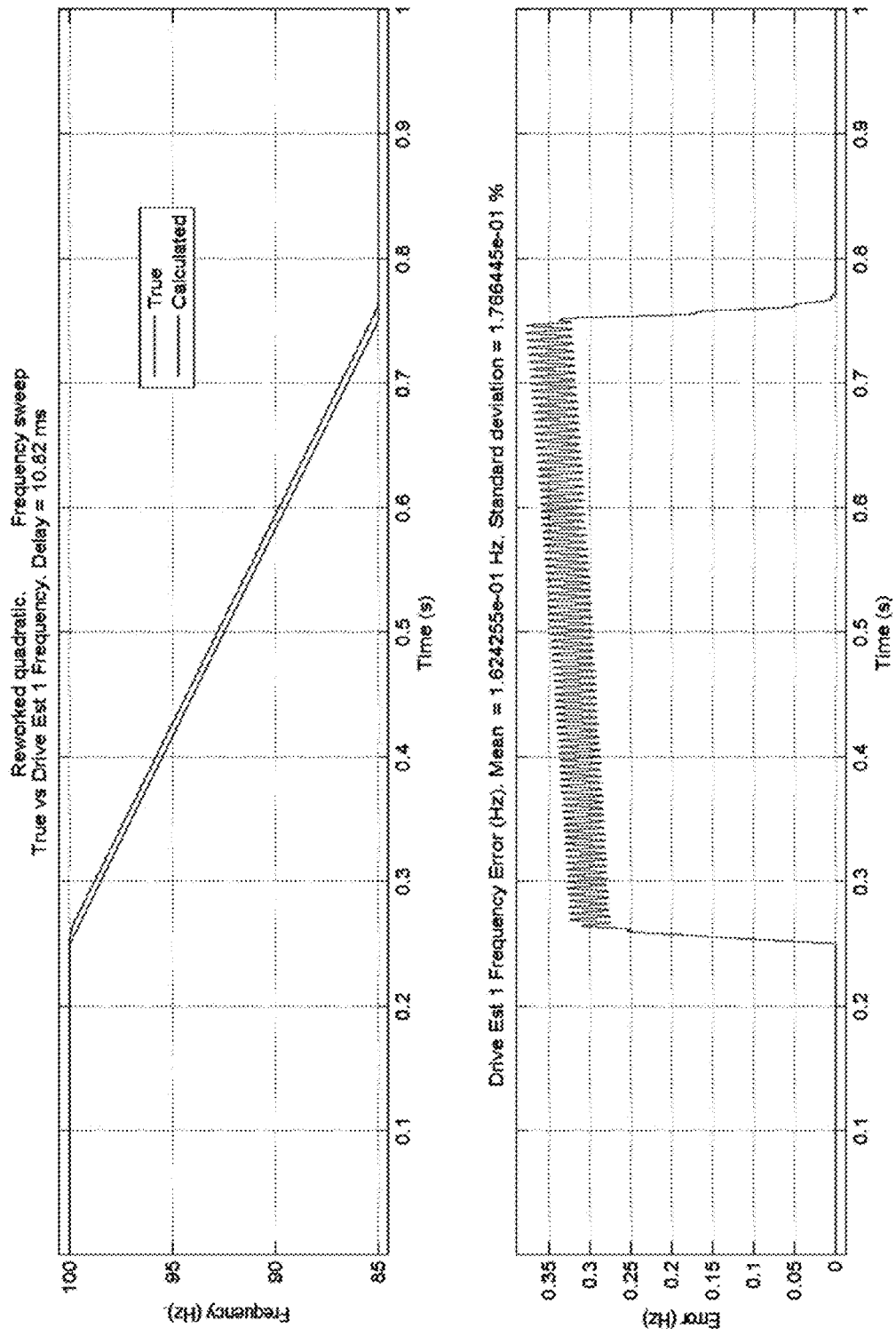
FIGS. 13-16 are graphs illustrating response of the Coriolis meter to a simulated frequency sweep.
Figure 14:
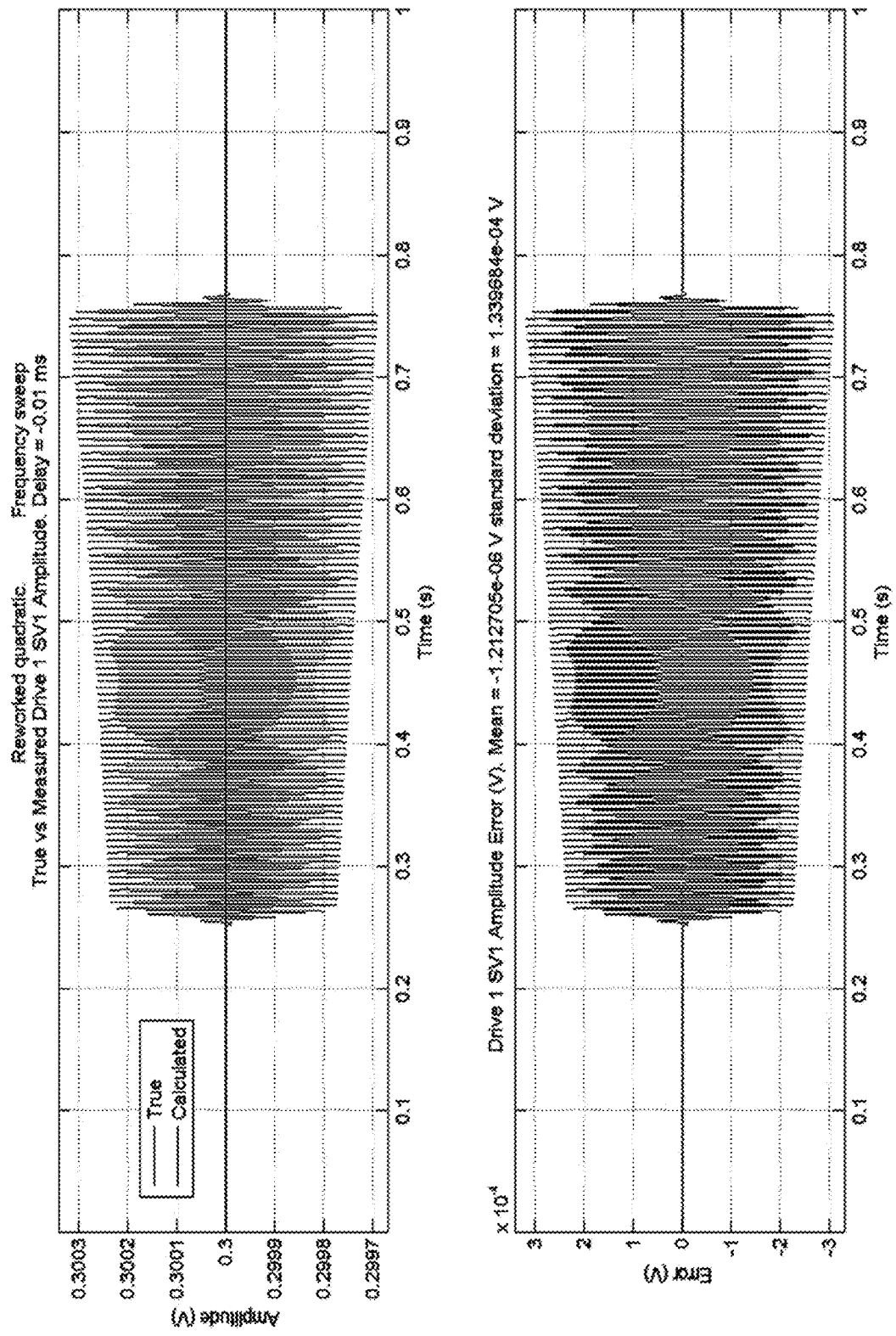
Figure 15:
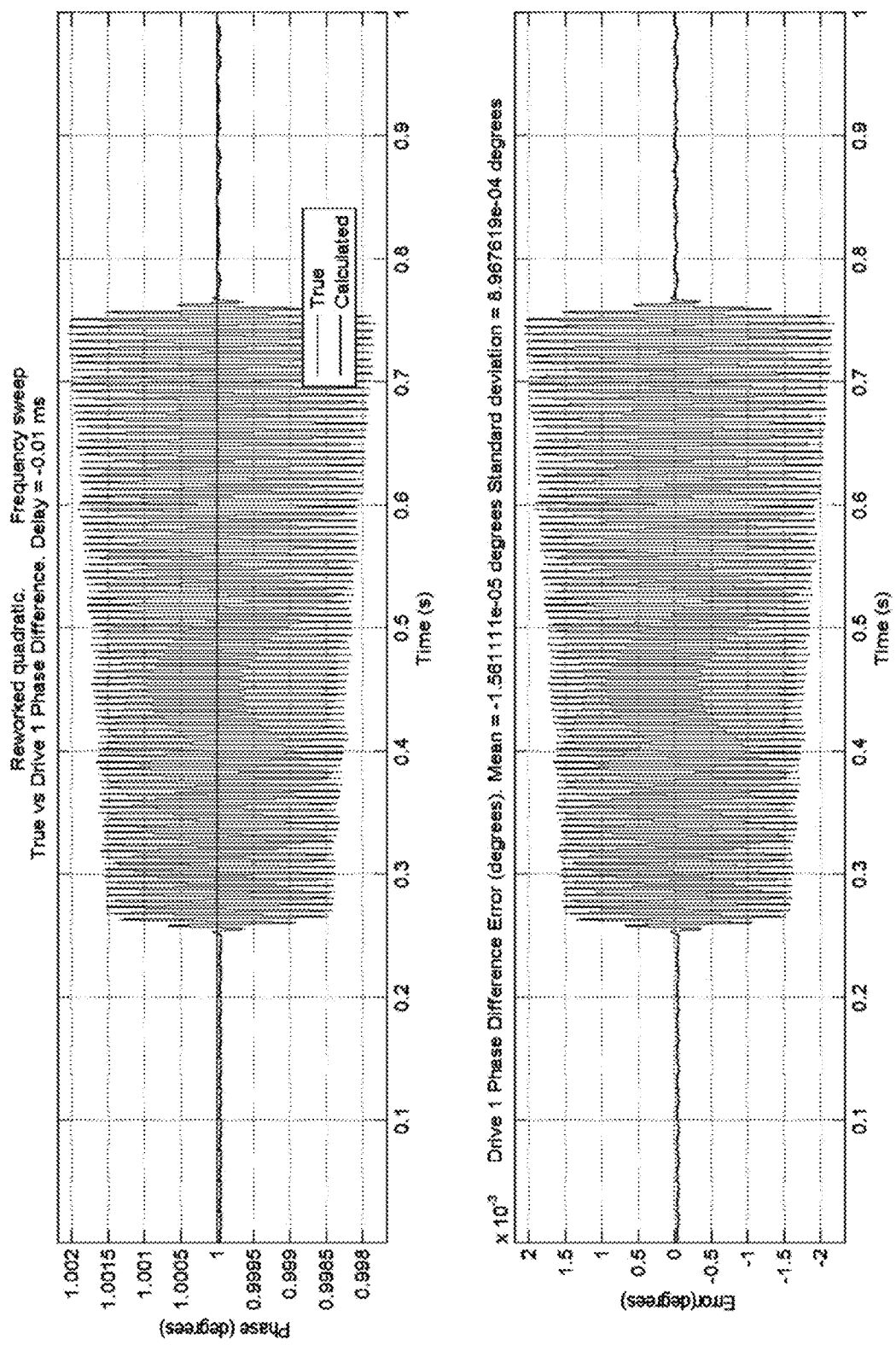
Figure 16:
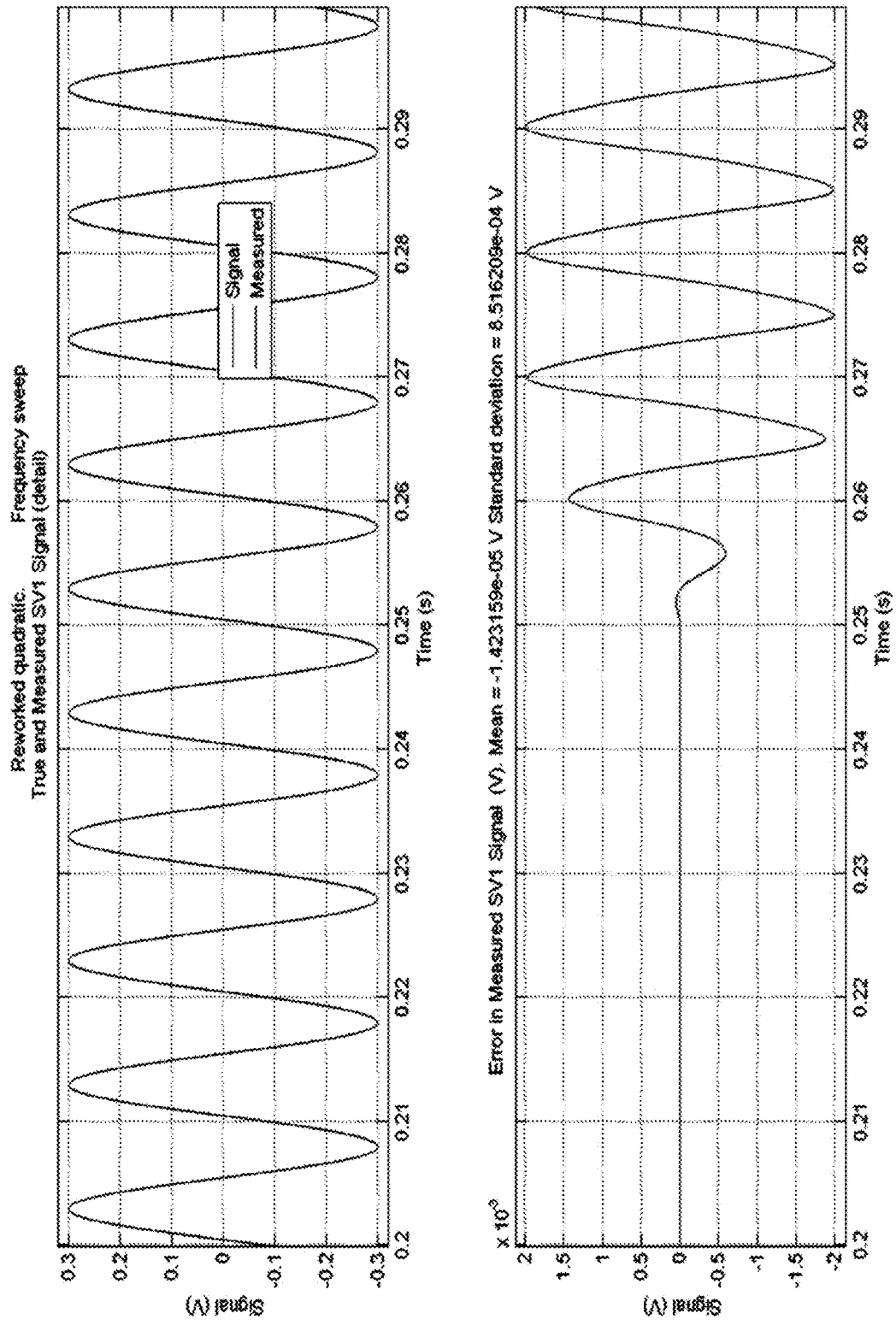
Figure 17:
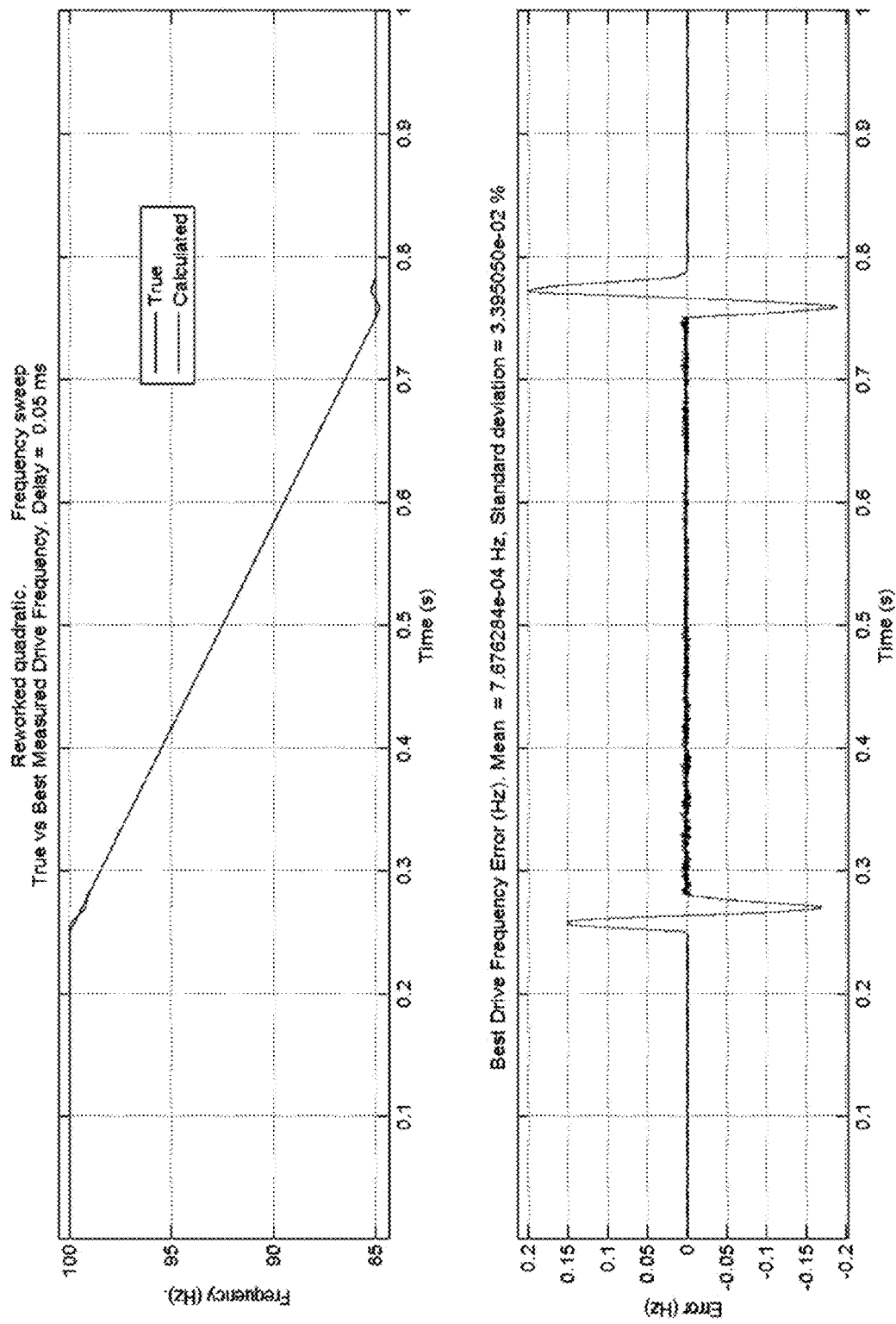
FIGS. 17-21 are graphs illustrating improve response of the Coriolis meter to a simulated frequency sweep after compensation.
Figure 18:
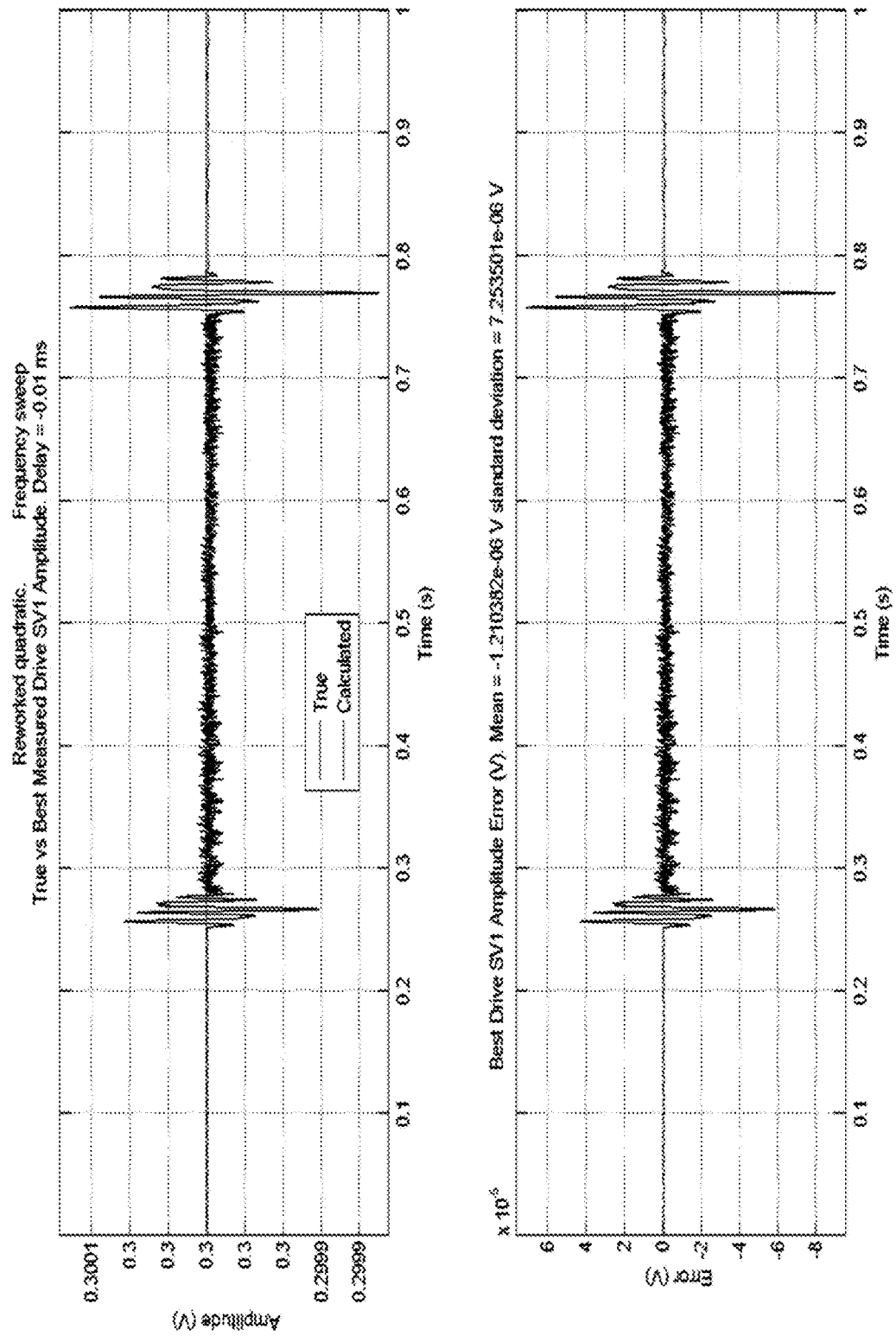
Figure 19:
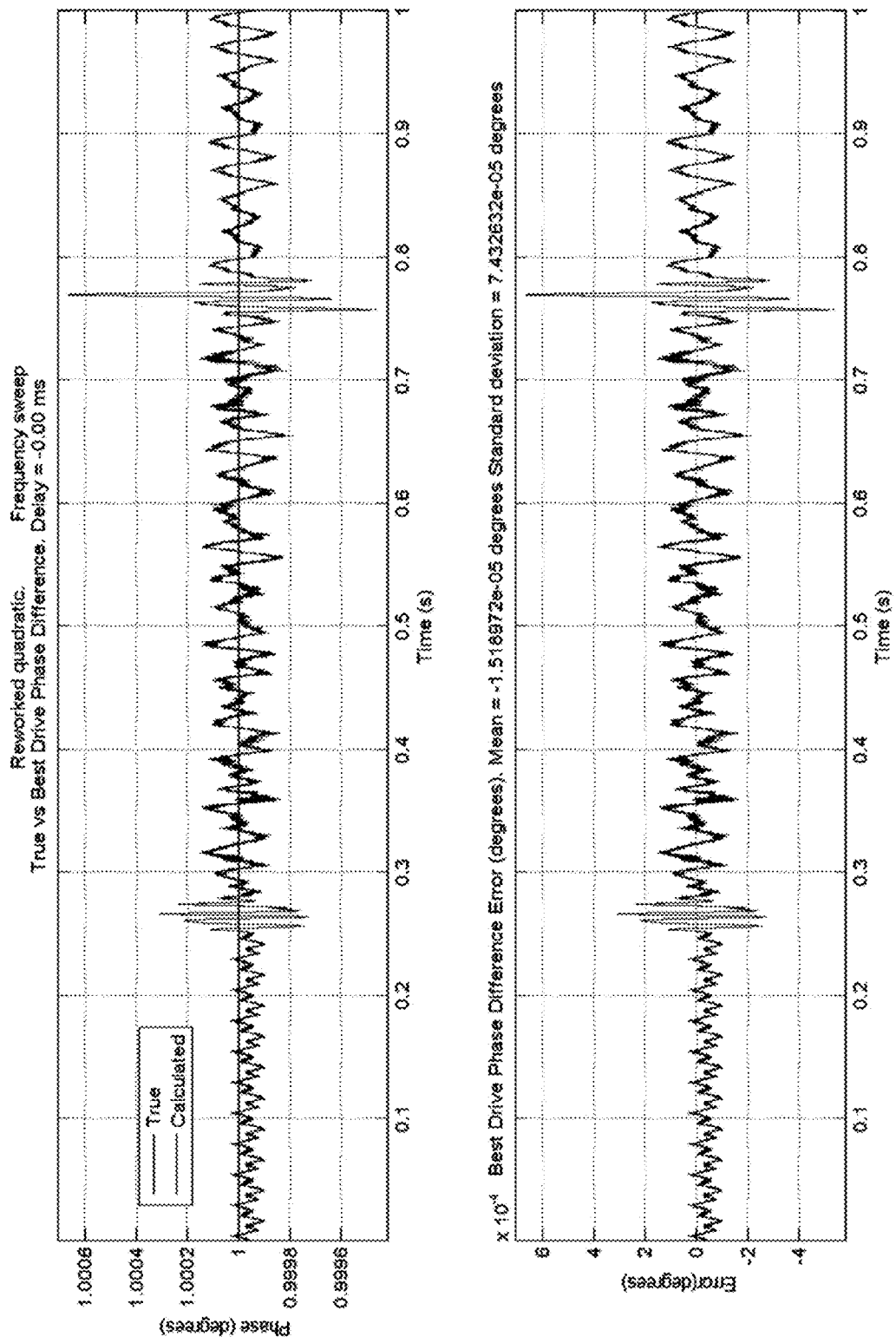
Figure 20:
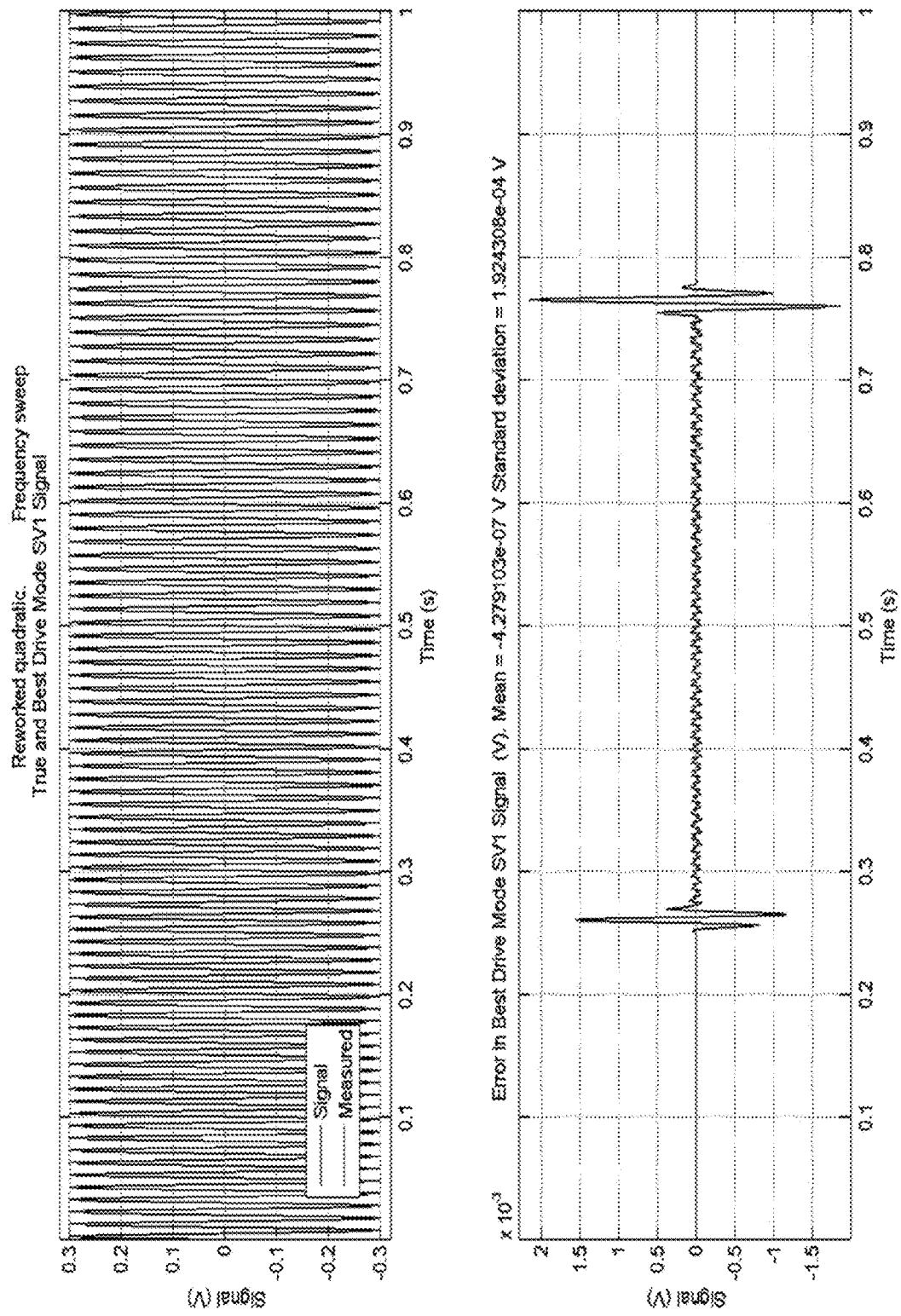
Figure 21:
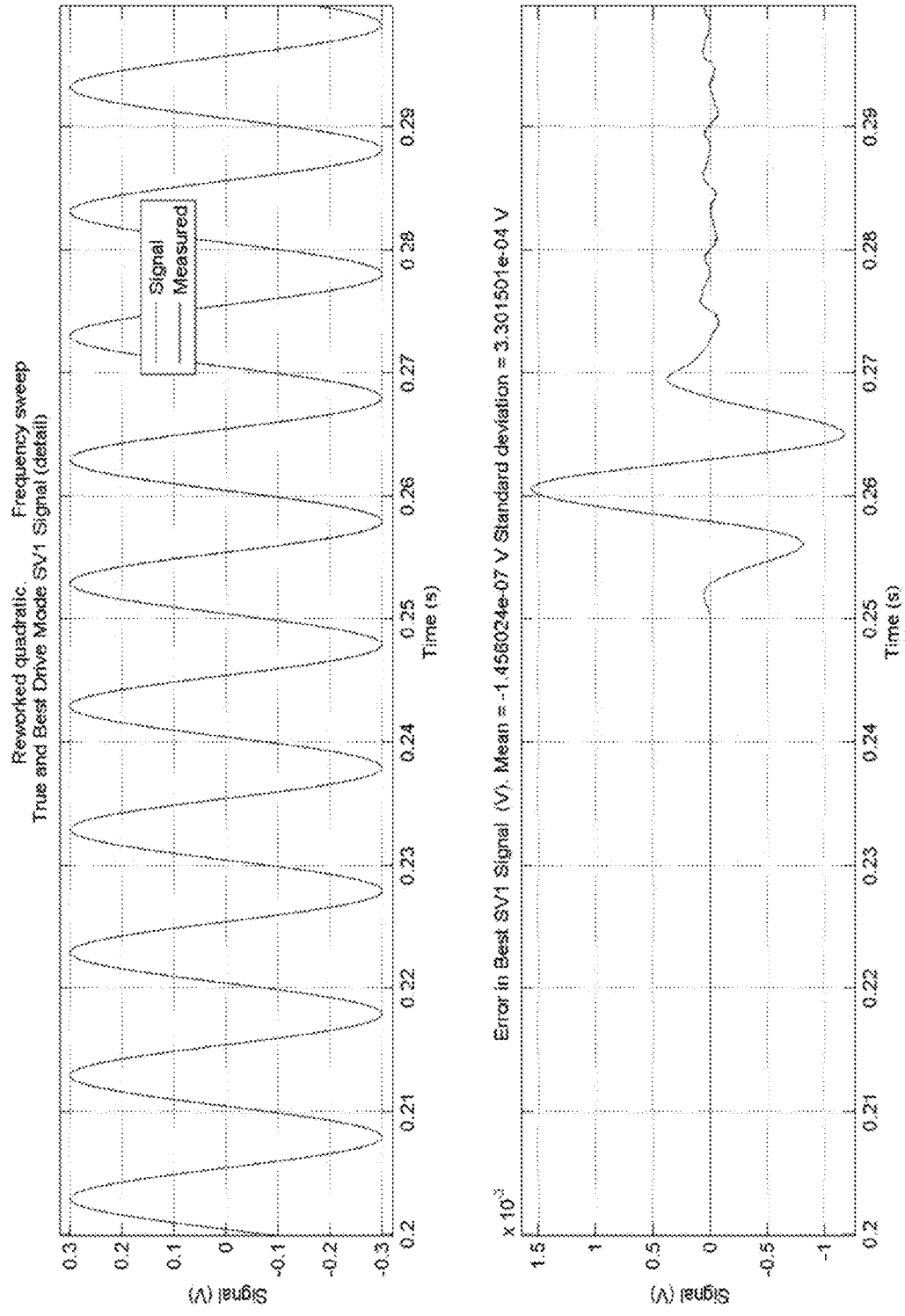
Figure 22:
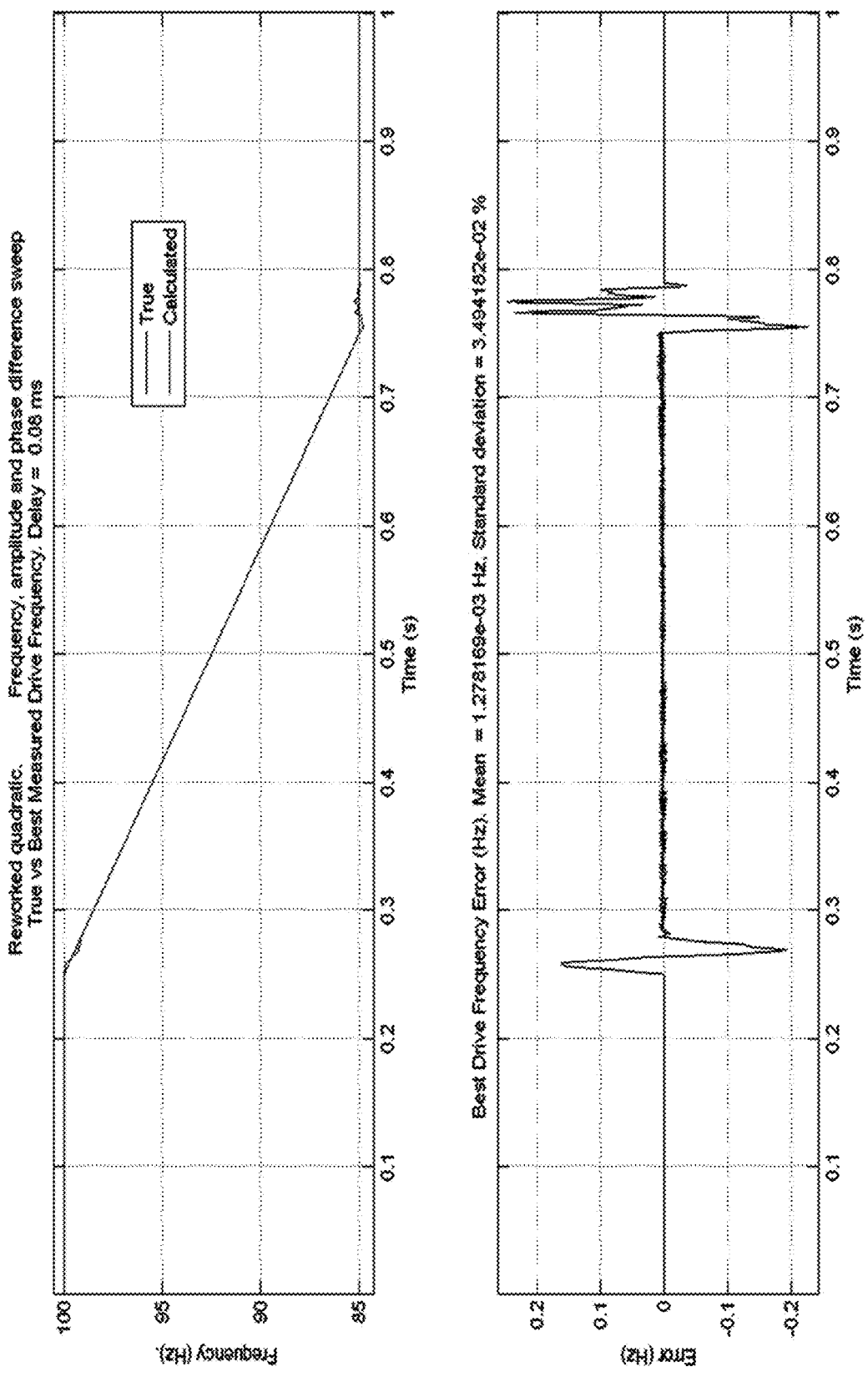
FIGS. 22-26 are graphs illustrating response of the Coriolis meter to a simulated sweep of frequency, amplitude, and phase difference.
Figure 23:
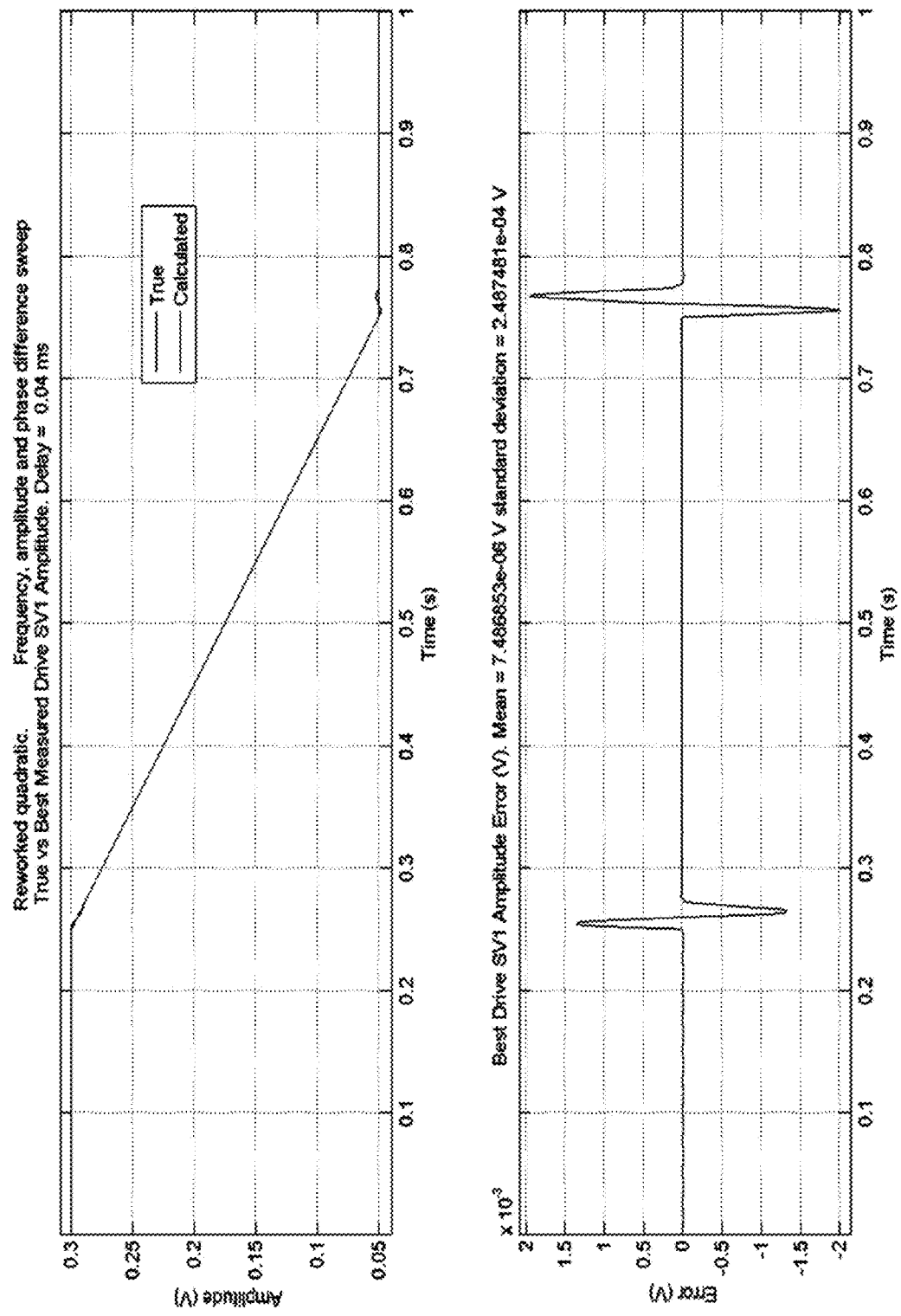
Figure 24:
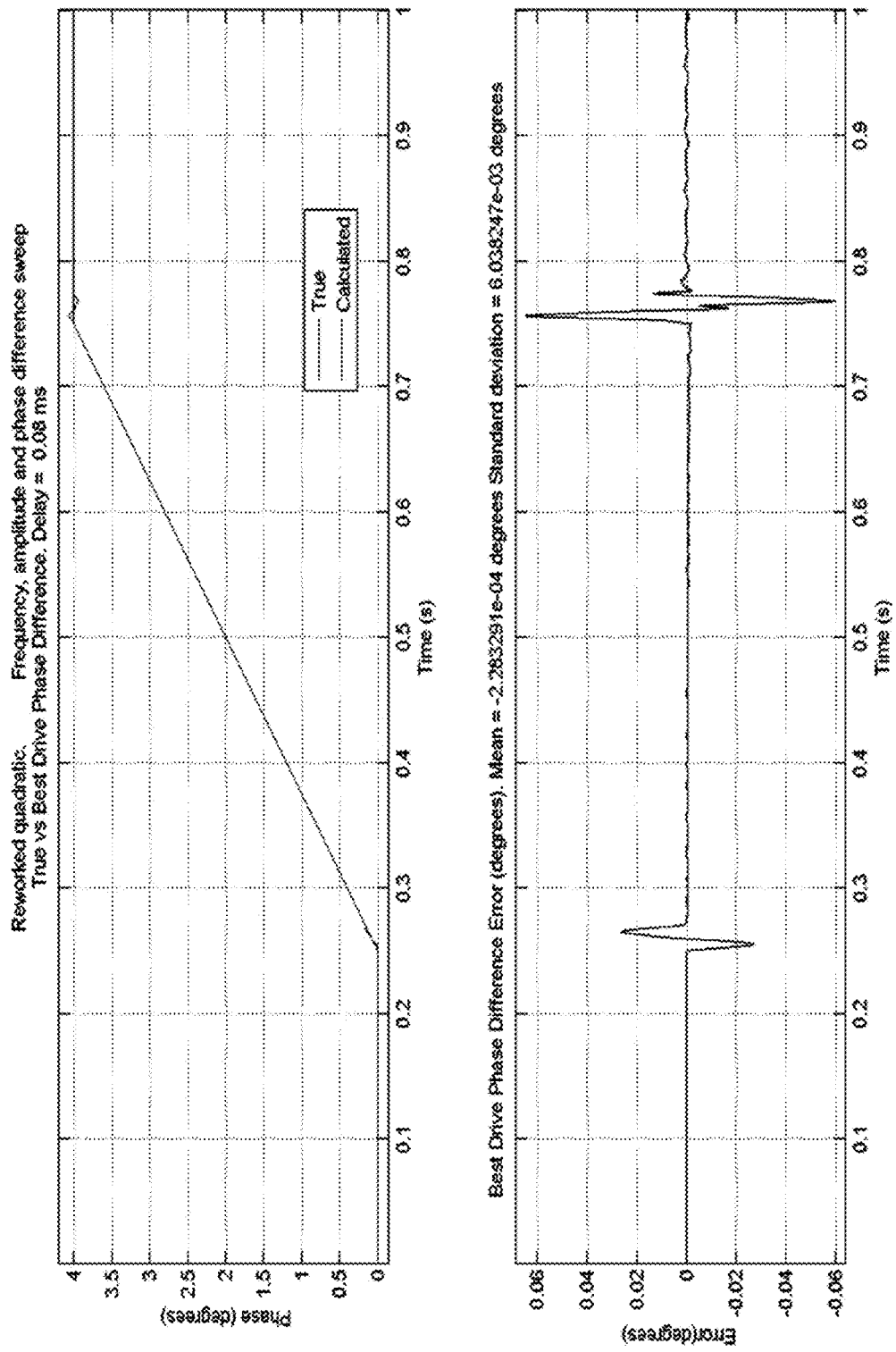
Figure 25:
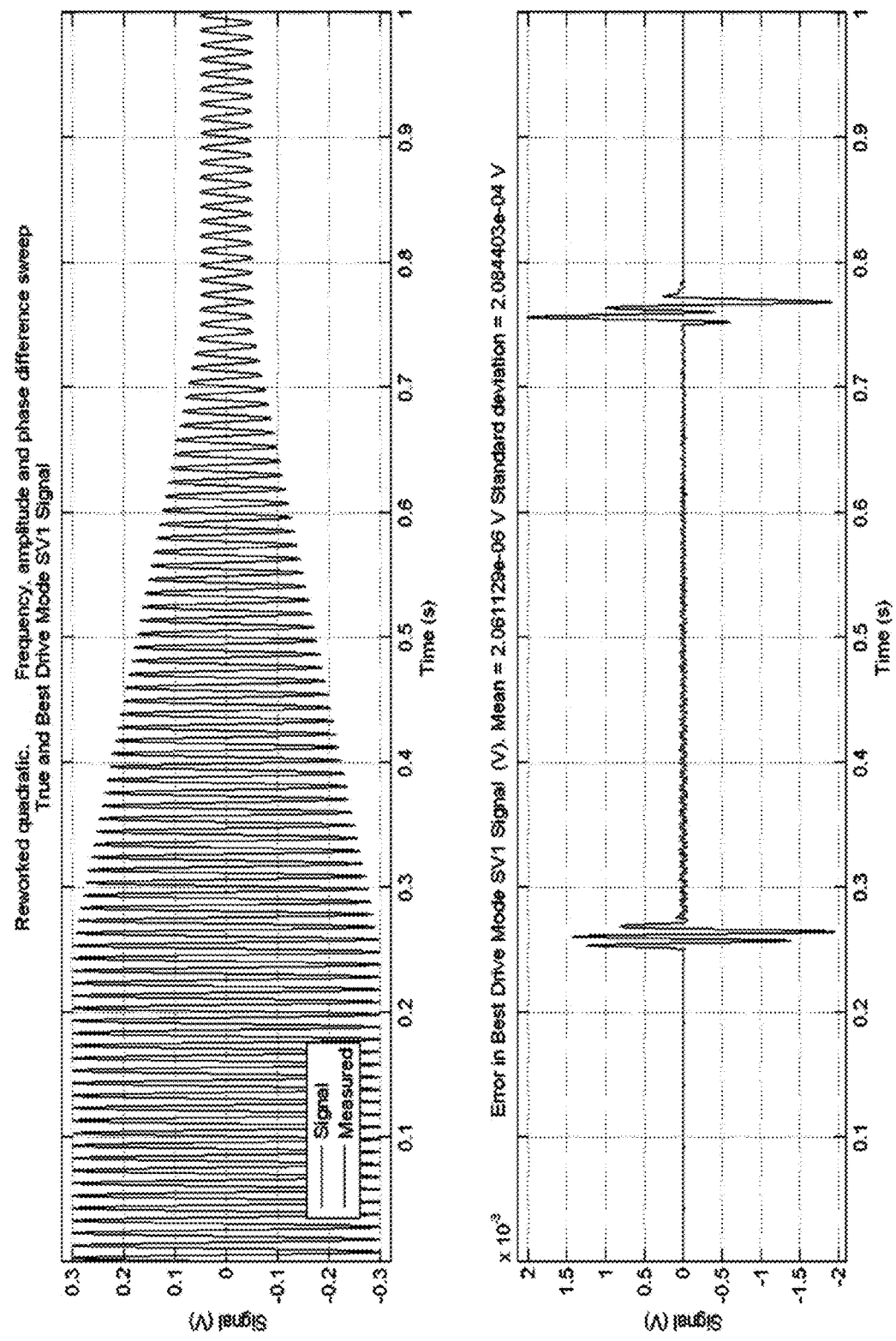
Figure 26:
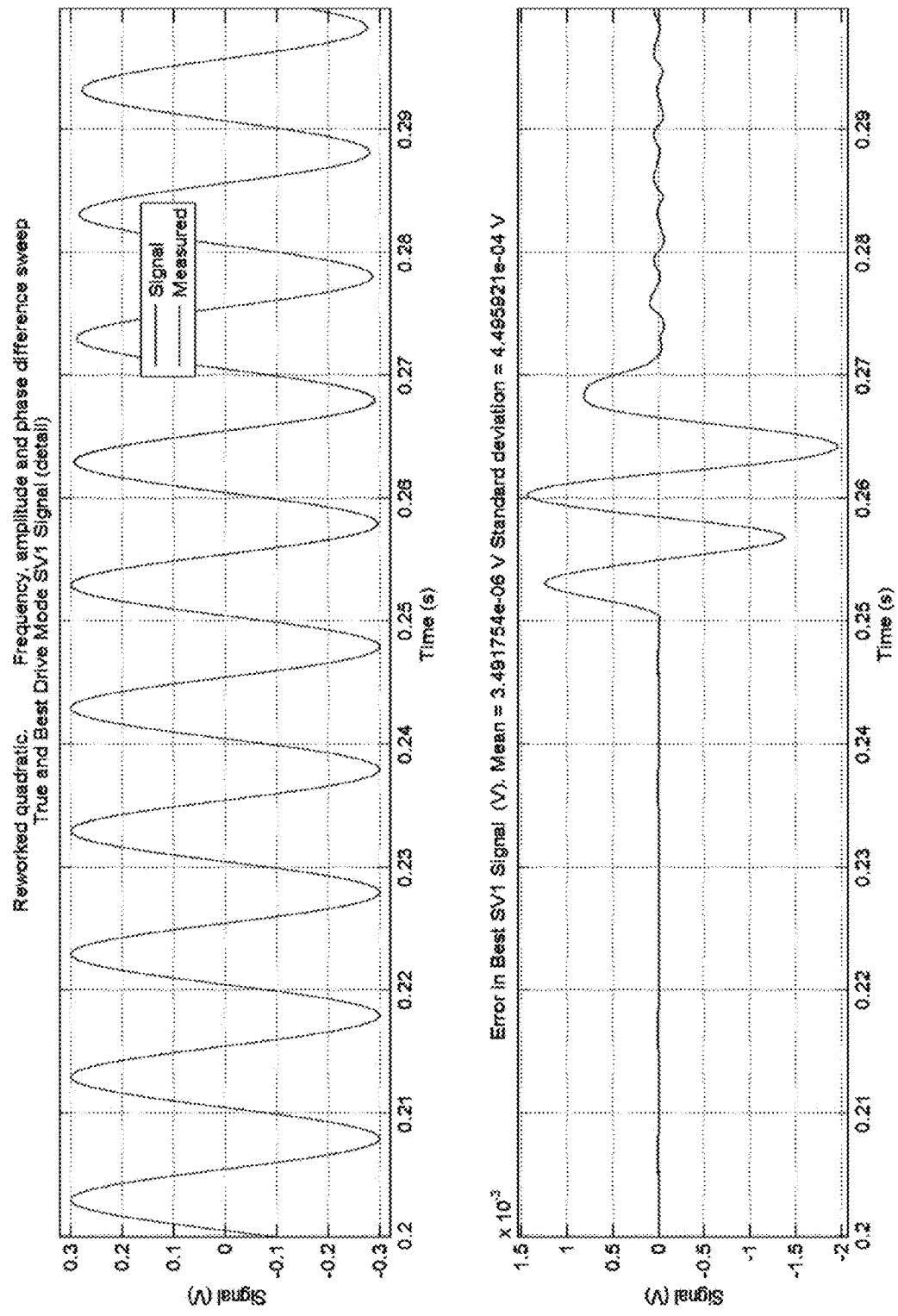

FIGS. 13-16 show operation of the processor 101 during a simplified simulation of a frequency change corresponding to change in frequency that could be encountered during a transition of the conduit from empty to full of liquid. The frequency drops from 100 Hz to 85 Hz in 0.5 s. The upper graph in FIG. 13 shows there is one-cycle delay in the frequency response, which results in the error in the lower graph. FIGS. 14 and 15 show that there is error associated with a half-cycle delay in the amplitude and phase difference response as well. FIG. 16 shows error in the measured signal at the start of the change in the frequency. Moreover, FIGS. 13-16 show that there are structured modulation errors in many of the measurements associated with the rapid changes, such as the rapid change in frequency during the frequency sweep.

FIGS. 17-22 illustrate the improvement in the performance of the processor 101 after making the following compensations. First, the dynamic response is compensated to account for the half-cycle delay in the amplitude and phase difference as well as the full cycle delay in the frequency response. Another compensation is to use quadratic extrapolation based on the last cycle of data to improve the measurements. Further, the modulation errors are compensated. The result is that the errors, which are represented in the lower graphs on FIGS. 17-22, are lower than in the corresponding graphs for the uncompensated example. The compensations are generally successful, but less so at the beginning and end of the rapid transition.

FIGS. 22-26 illustrate the response of the processor 101 to a simulated simultaneous change in frequency, amplitude, and phase difference. The frequency drops from 100 Hz to 85 Hz, the amplitude drops from 0.3 V to 0.05 V, and the phase difference increases from 0 degrees to 4 degrees, all in 0.5 s. This represents a more realistic simulation of conditions that may be experienced during the filling of the meter with liquid, as not only does the resonant frequency change (similar to the drop from 100 Hz to 85 Hz in the simulated signals), but increased damping on the conduit is likely to lead to a drop in the amplitude of oscillation (similar to the drop in amplitude from 0.3V to 0.05V in the simulated signals), while the flowrate changes rapidly from zero to a positive value and thereby causes an abrupt increase in the phase difference (similar to the increase in the phase difference from 0 degrees to 4 degrees in the simulated signals). Similar compensations to those used in FIGS. 17-21 are applied. Again, the compensations are generally successful at minimizing error, but less so at the beginning and end of the rapid transition period.

Figure 27:
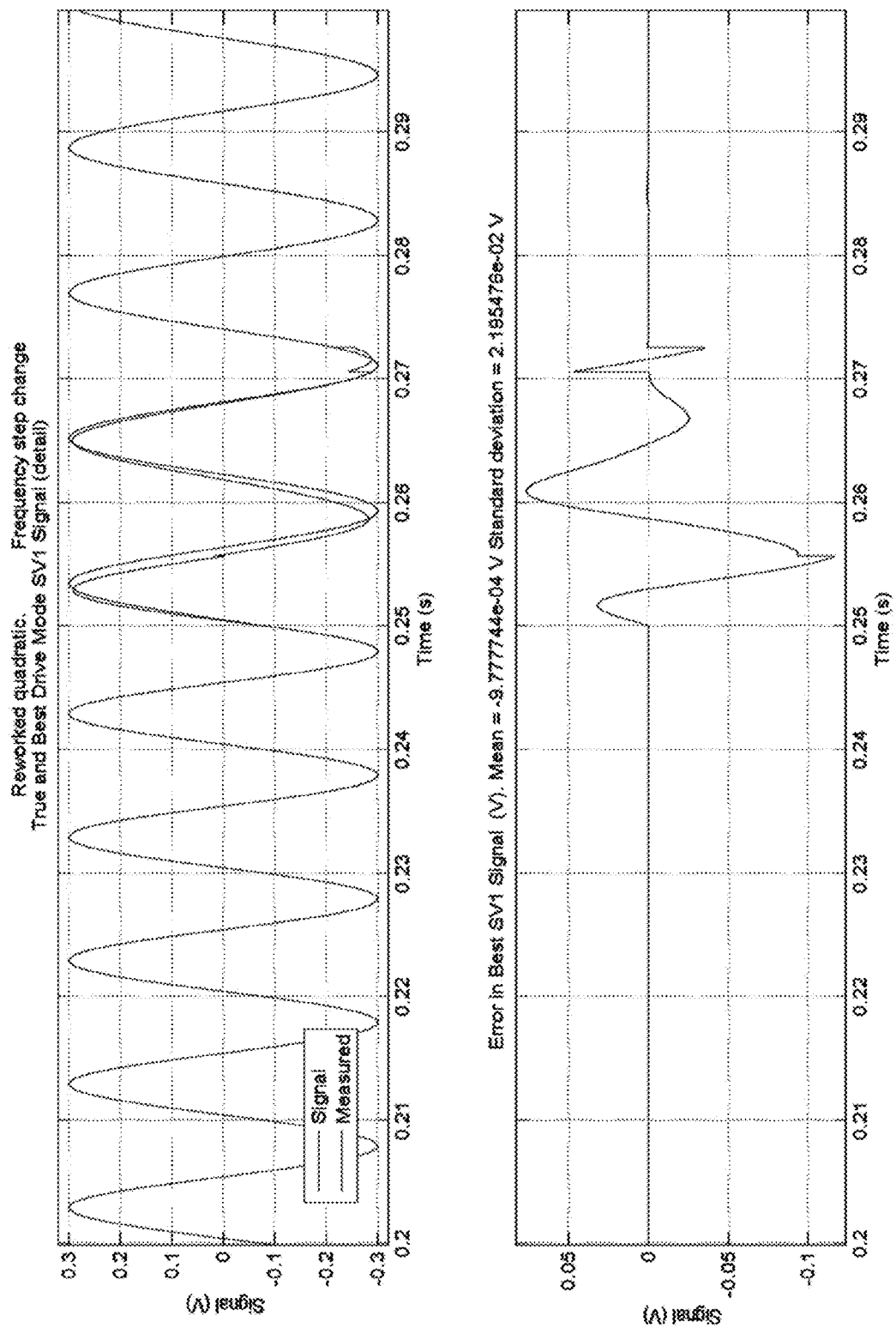
FIG. 27 shows the response of the Coriolis meter to a step change in frequency from 100 Hz to 85 Hz.
Figure 28:
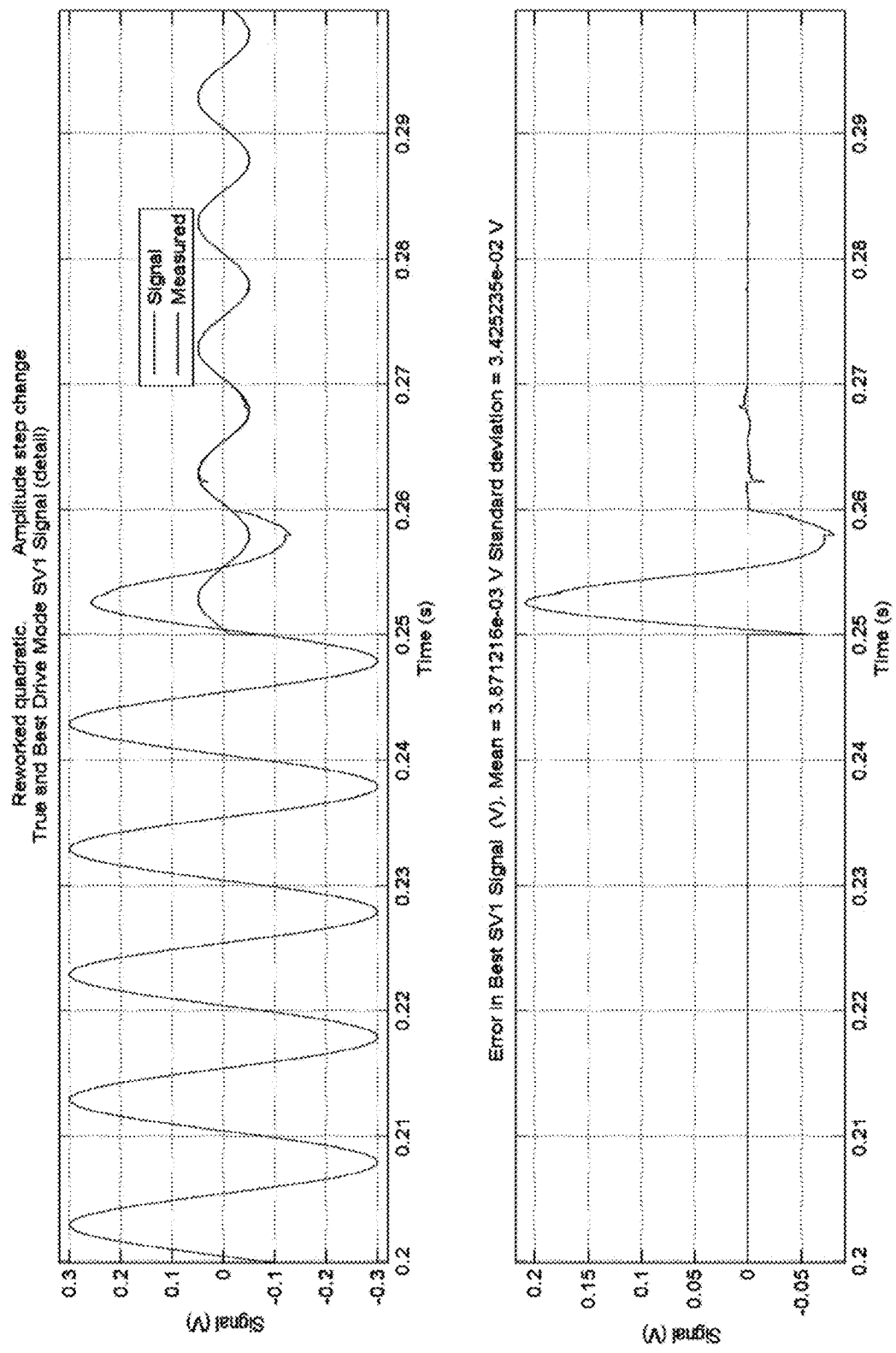
FIG. 28 shows the response of the Coriolis meter to a step change in the amplitude from 0.3 V to 0.05 V.
Figure 29:
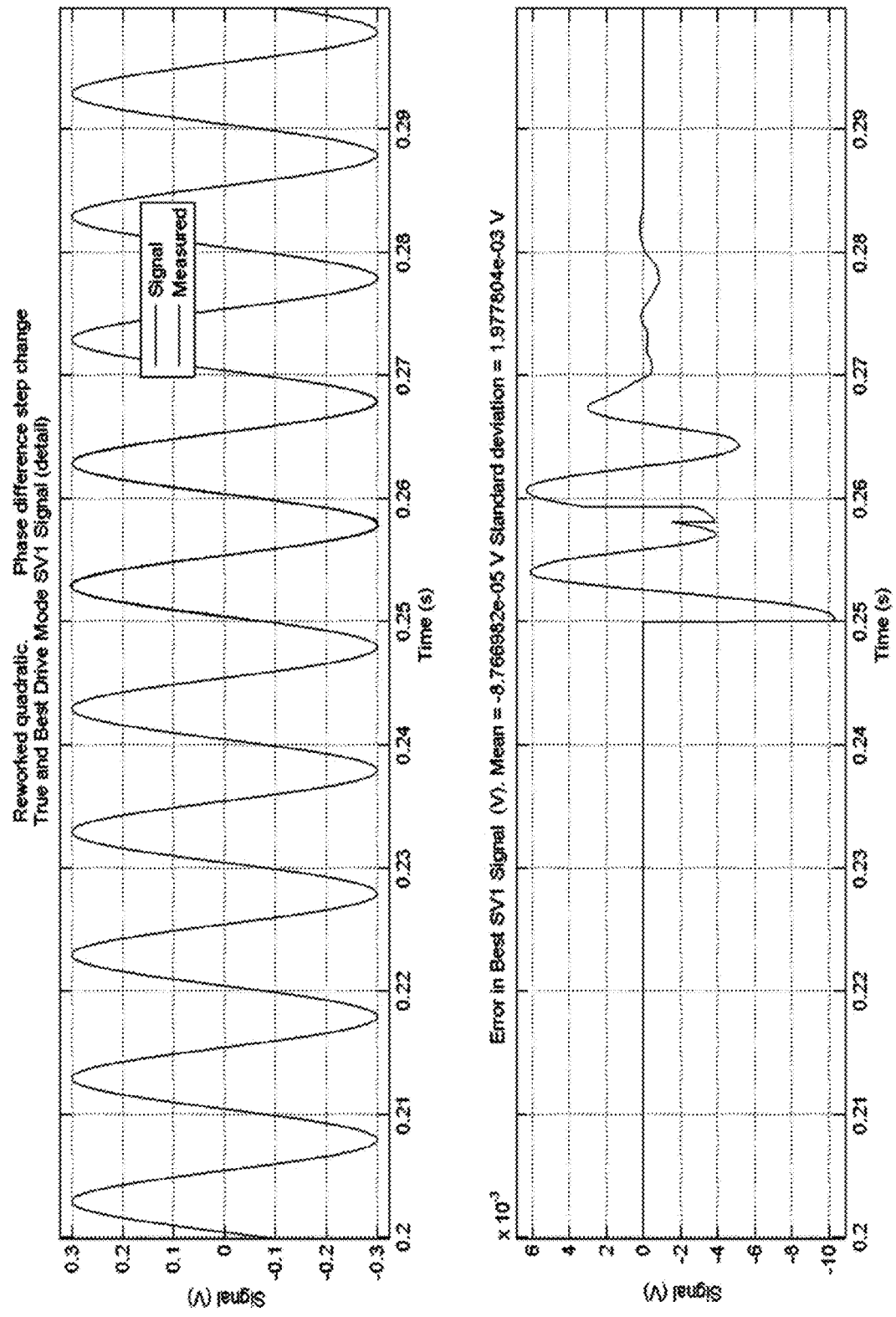
FIG. 29 shows the response to a step change in the phase difference from zero degrees to 4 degrees.
Figure 30:
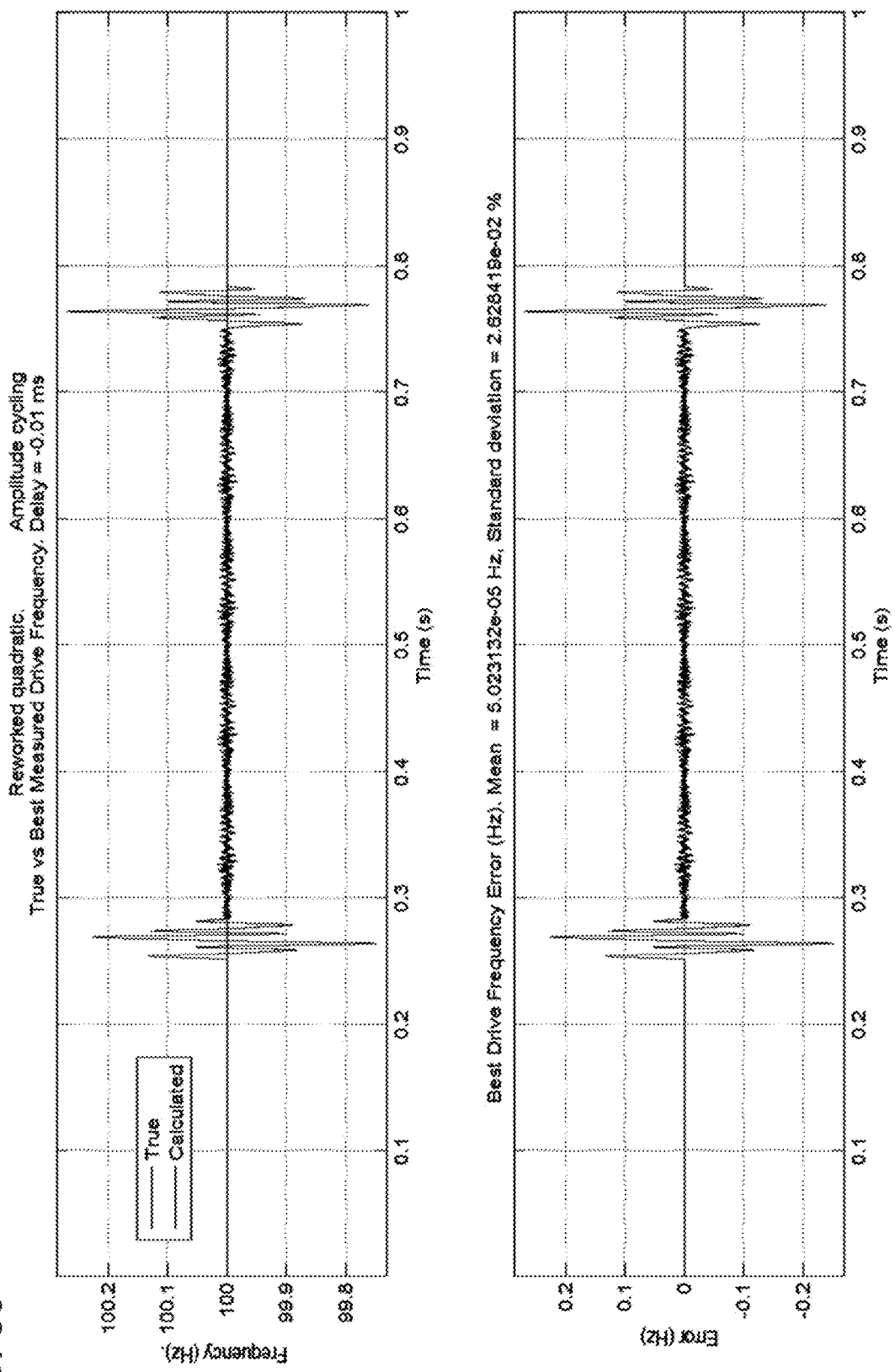
FIGS. 30-35 show the response to a signal that has a steady frequency of 100 Hz, a steady phase difference of 1 degree, and an amplitude that cycles between 0.2V and 0.3V at a frequency of 10 Hz.

FIG. 27 shows the response to a step change in frequency from 100 Hz to 85 Hz. Such an instantaneous change is unlikely to be caused by any physical change associated with real-life flow conditions, but simulated step changes are used to test the robustness of the system 101 to very sudden changes. FIG. 28 shows the response to a step change in the amplitude from 0.3 V to 0.05 V. FIG. 29 shows the response to a step change in the phase difference from zero degrees to 4 degrees. The error signals in the lower graphs for FIGS. 27-29 show that the errors associated with the transitions are limited to within two cycles of the change. In contrast, a conventional Coriolis meter processor would typically require about 300 ms to recover from these step changes. Thus, the tests illustrated in FIGS. 27-29 demonstrate that the system 101 is significantly more robust to sudden changes than conventional Coriolis meters.

Figure 31:
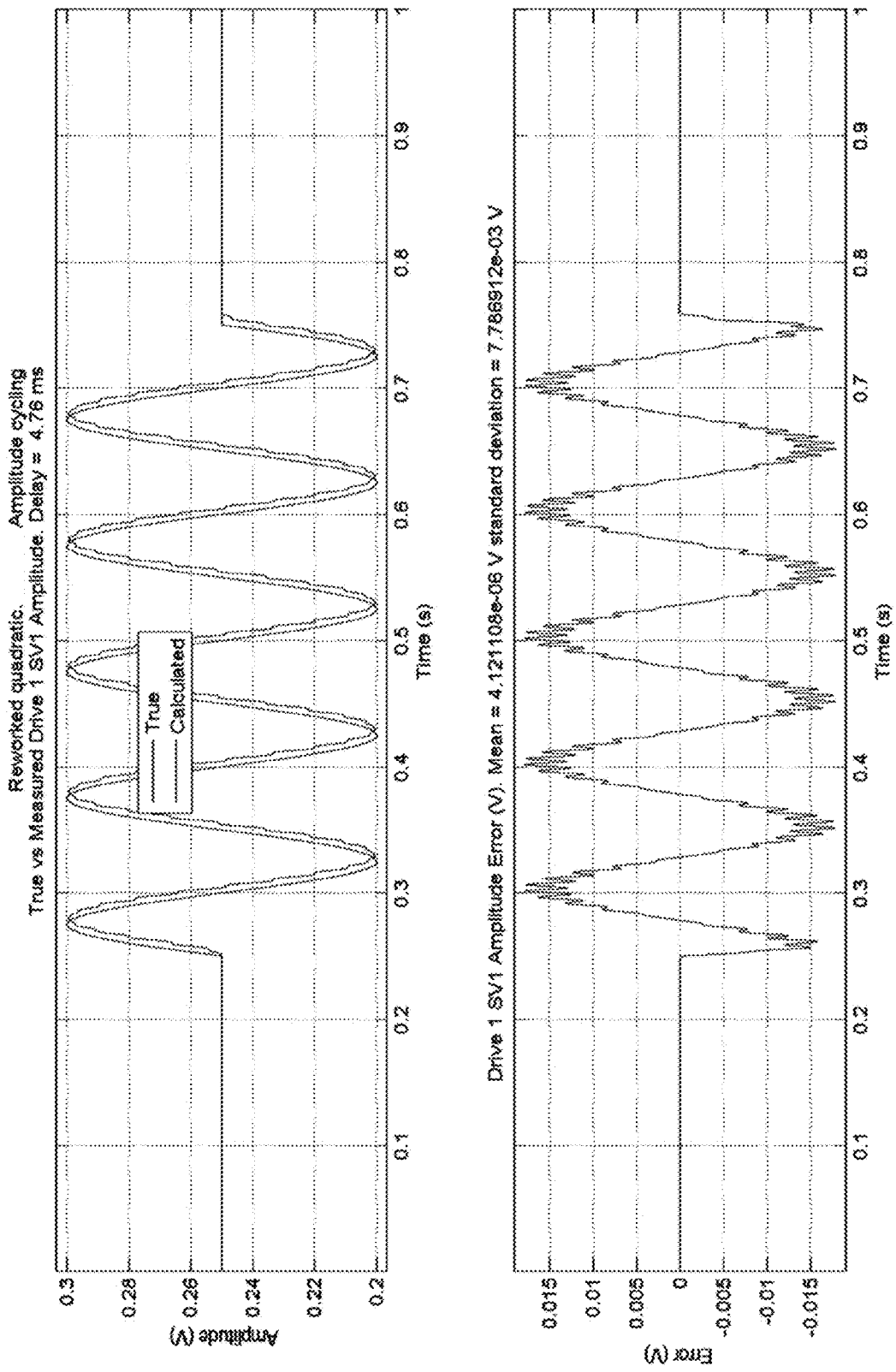
Figure 32:
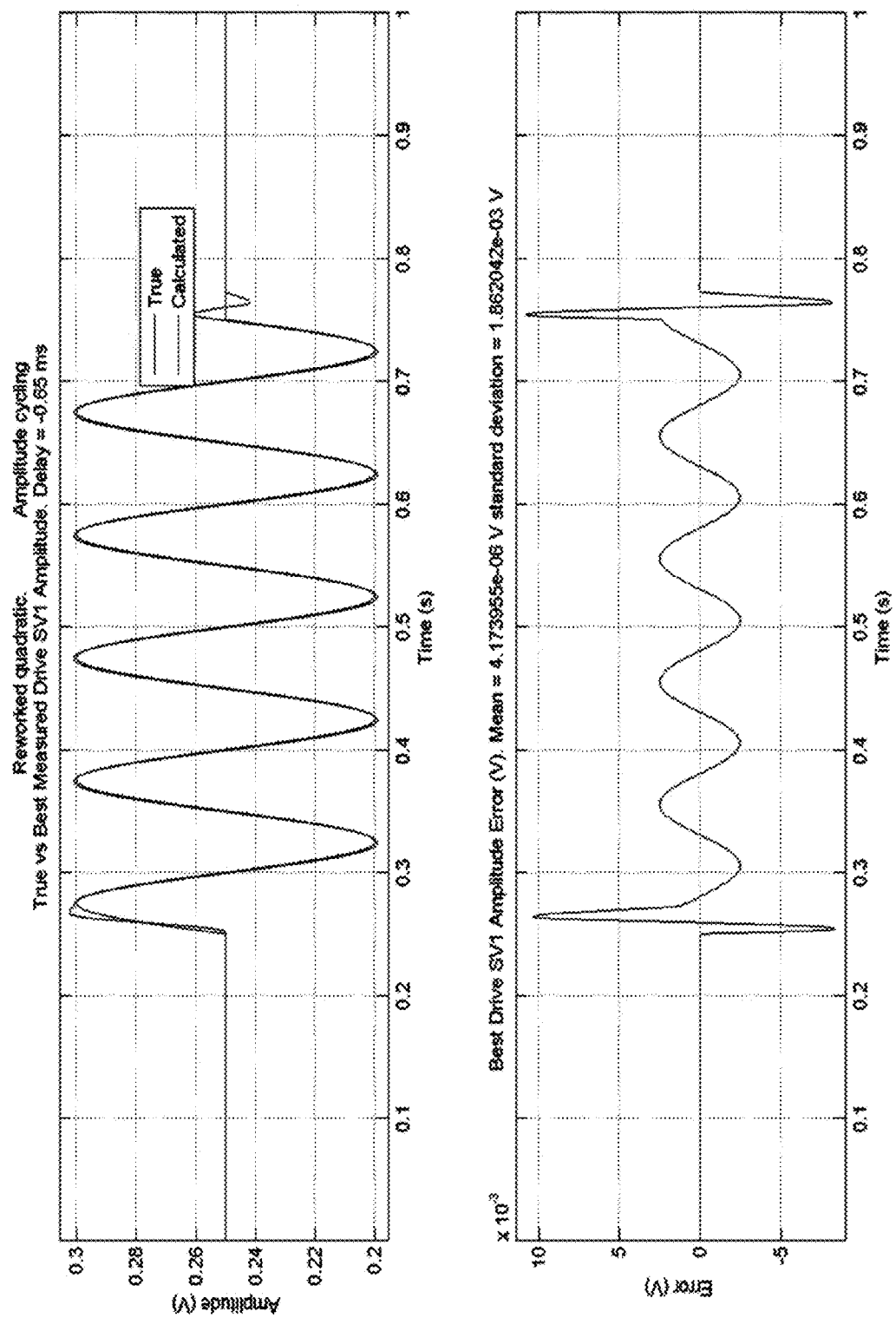
Figure 33:
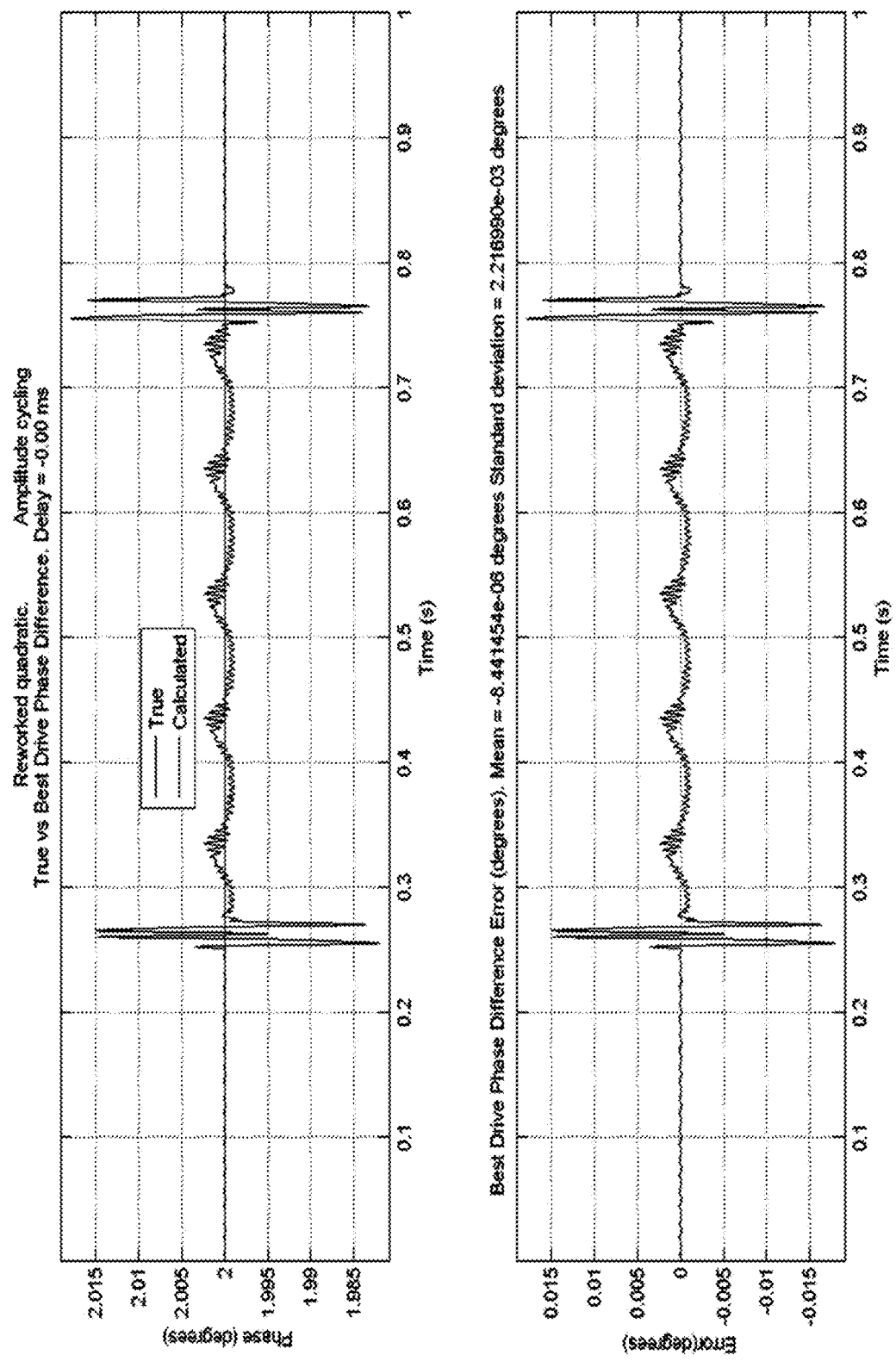
Figure 34:
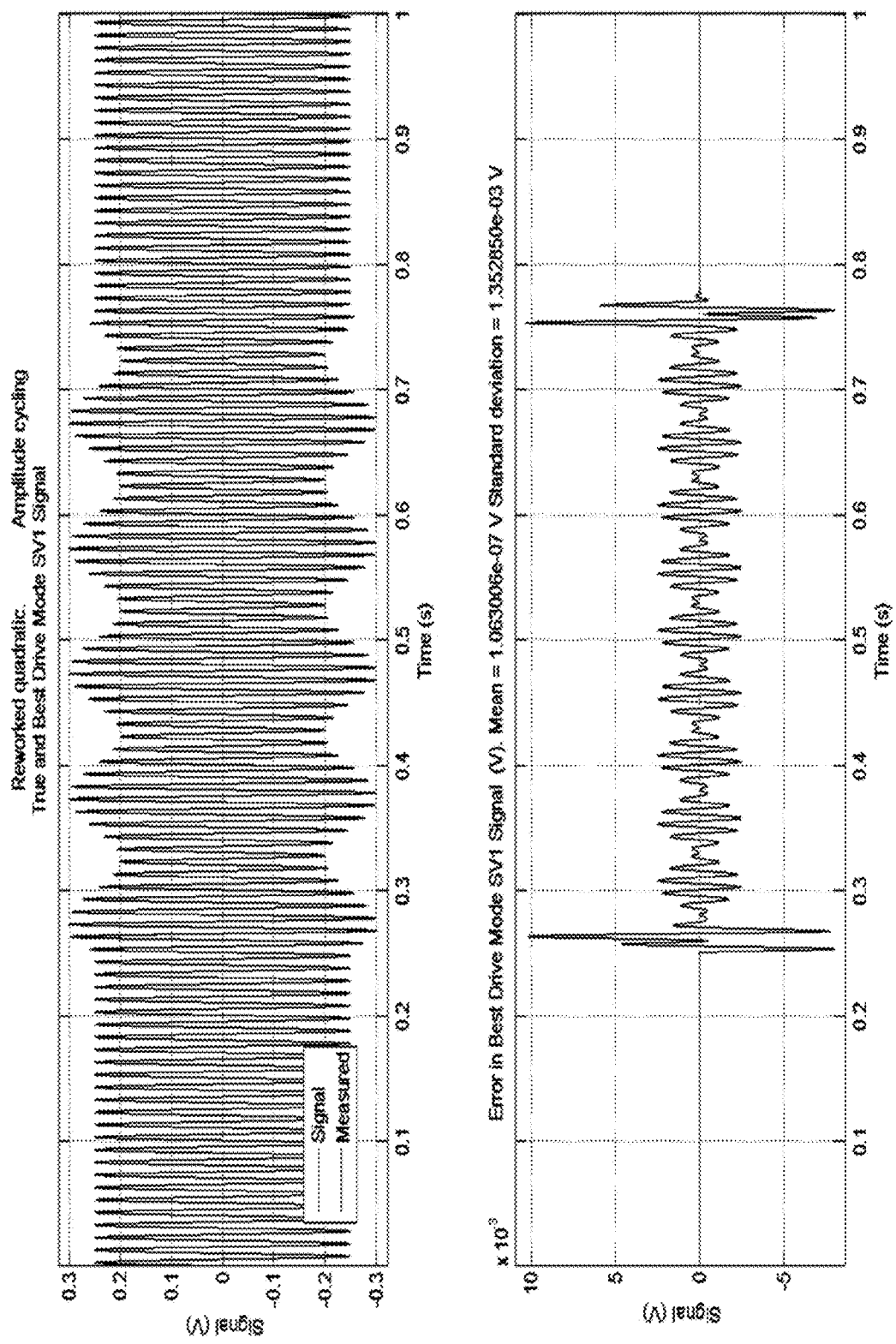
Figure 35:
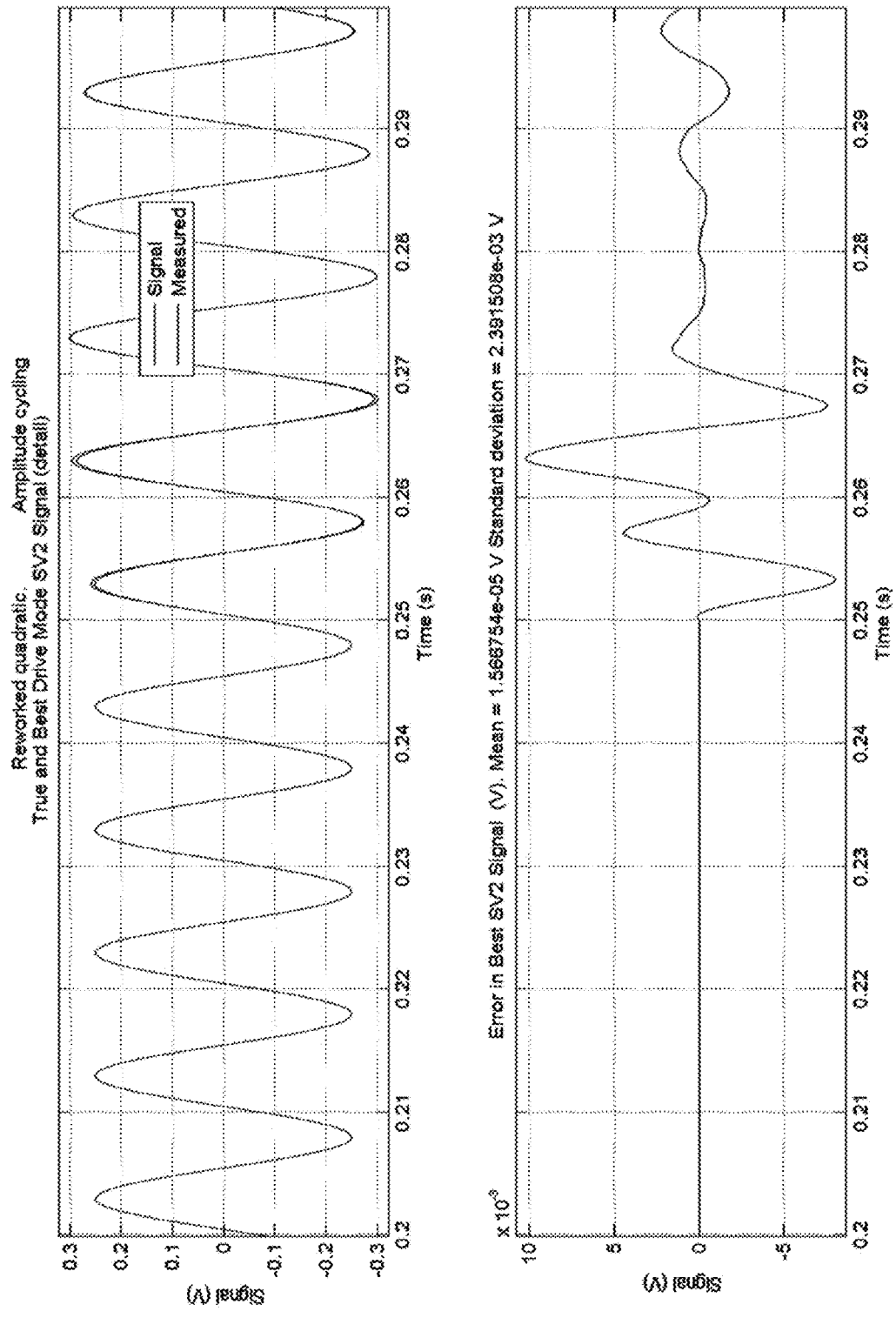

FIGS. 30-35 illustrate the response of the processor 101 to a signal that has a steady frequency of 100 Hz and a steady phase difference of 1 degree. The amplitude of the signal is 0.25 V+/−0.05 V modulating at 10 Hz, which is about 10 percent of the drive frequency. The error signals in the lower graphs on FIGS. 30-35 illustrate that tracking is generally fairly good. However, as before, the error is highest and the beginning and end of the period of transition and there are various smaller modulation errors apparent in the signal throughout the modulation of the simulated signal. It may be possible to improve performance further by compensating for these errors. For example, FIG. 31 shows the uncorrected amplitude error and FIG. 32 shows the corrected amplitude error, which is significantly smaller.

Figure 36:
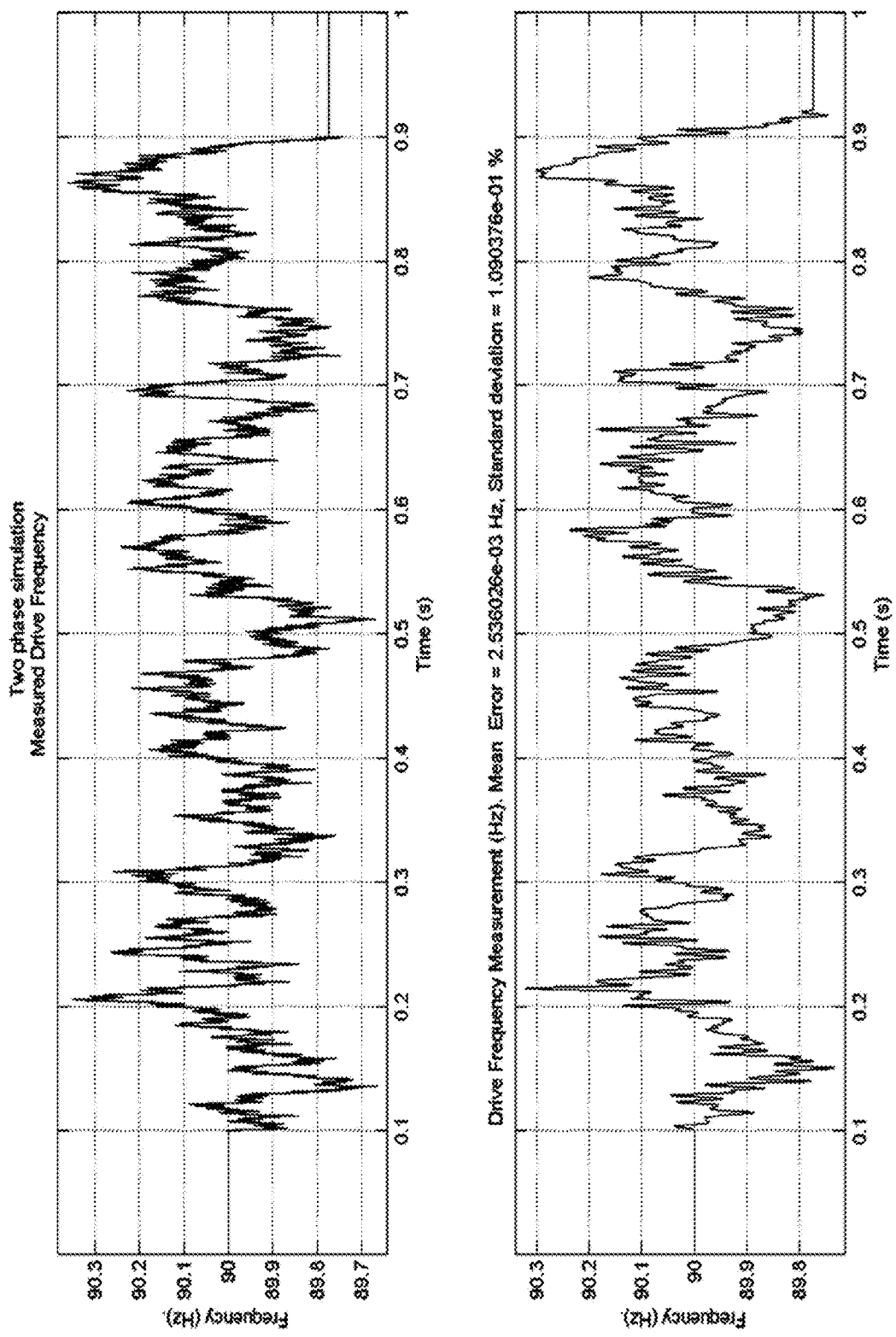
FIGS. 36-38 show tracking of the frequency, amplitude, and phase difference in response to a simulated signal having characteristics similar to those expected during two-phase flow.
Figure 37:
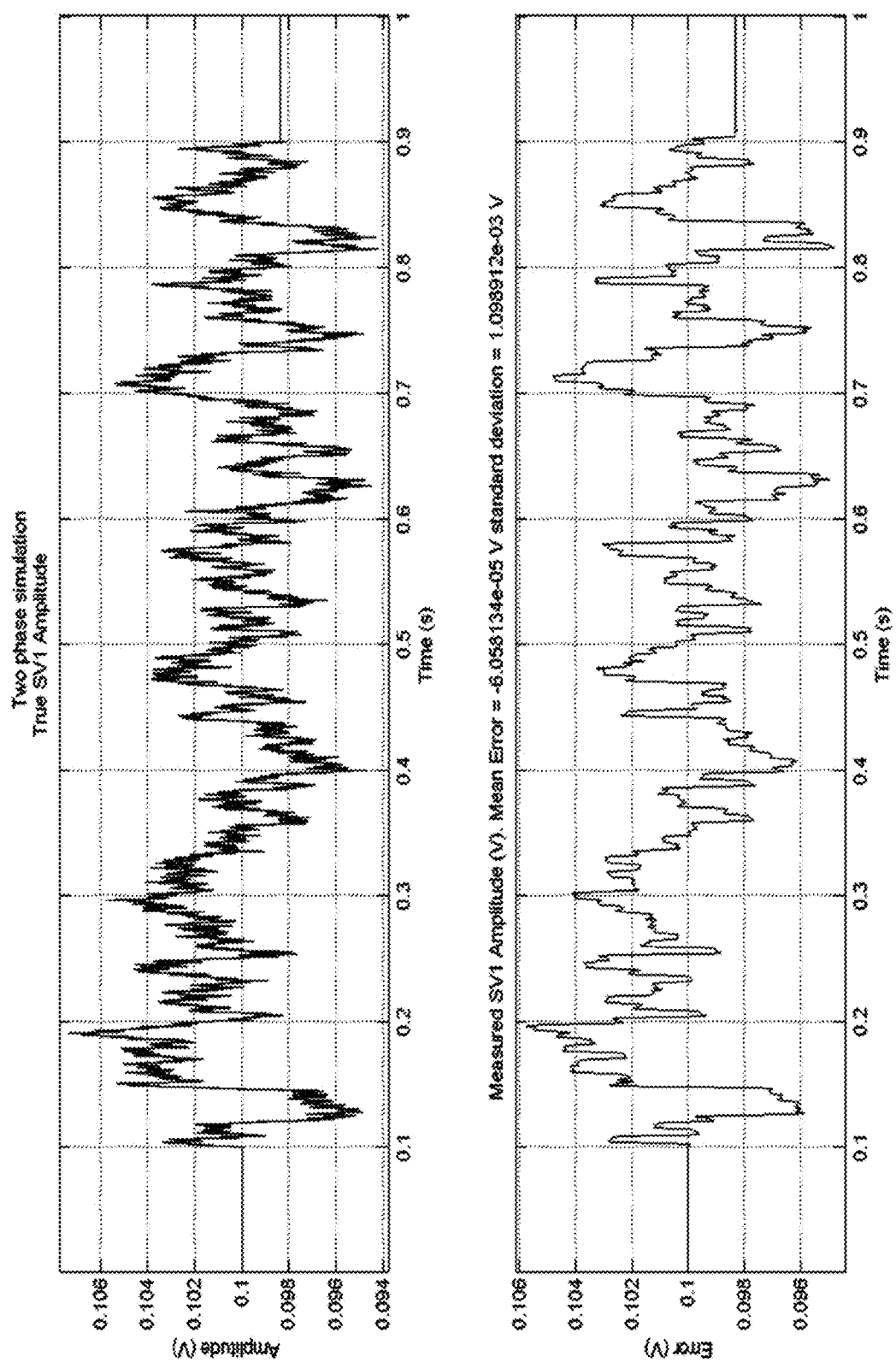
Figure 38:
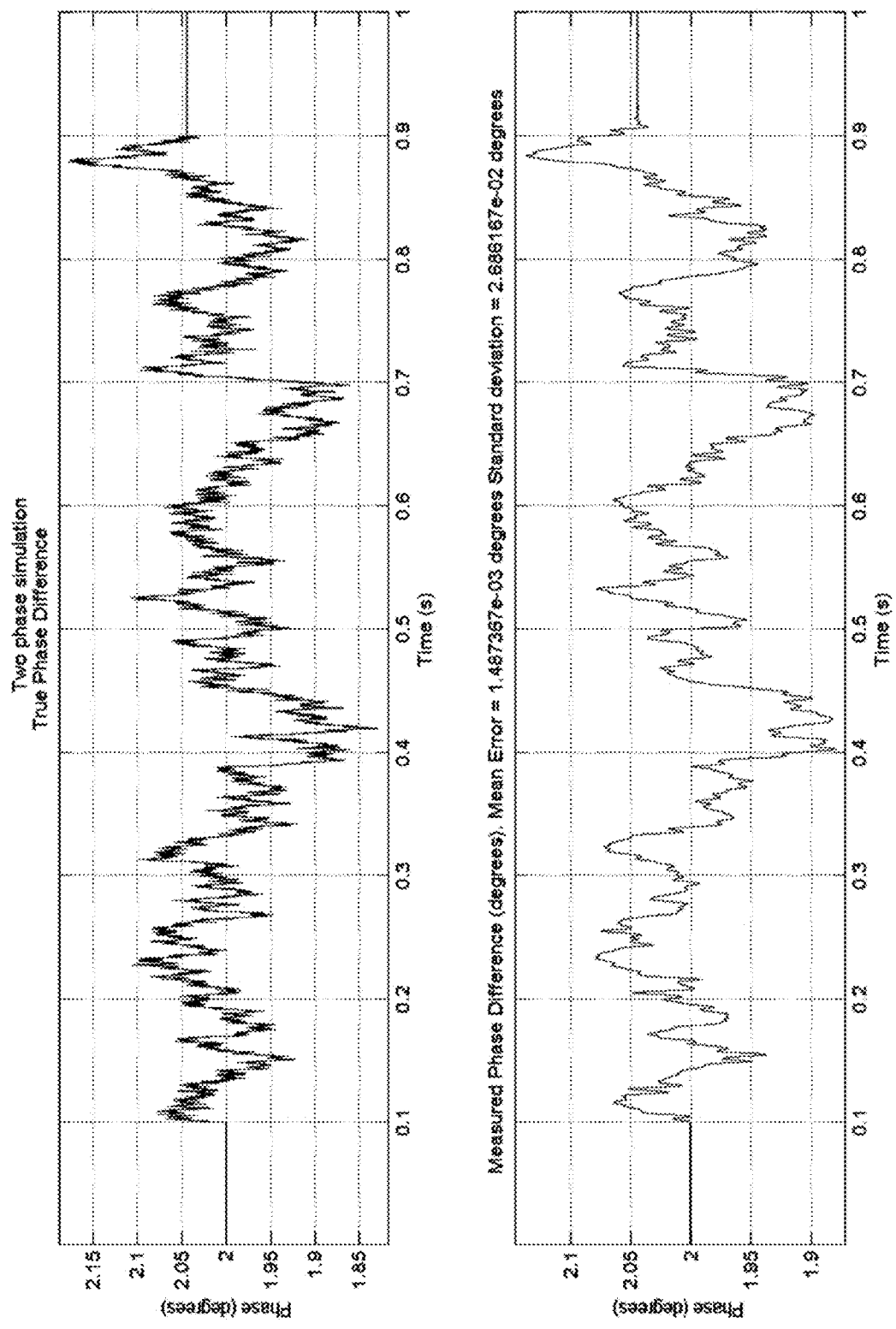

FIGS. 36-38 illustrate performance of the processor 101 during a simulation of two-phase flow. The simulated signal has a frequency varying randomly around 90 Hz. The amplitude varies randomly around 0.1 V. The phase difference varies randomly around 2 degrees. The measured frequency, amplitude, and phase difference tracks well with the simulated signal. This indicates the performance of the processor 101 to these simulated conditions compares favorably to the processors of existing Coriolis meters during two phase flow.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow.

The specification and drawings are accordingly to be regarded in an illustrative rather than restrictive sense.

The Abstract is provided to help the reader quickly ascertain the nature of the technical disclosure. It is submitted with the understanding that it will not be used to interpret or limit the scope or meaning of the claims.

What is claimed is:

1. A Coriolis flowmeter comprising:
a conduit configured to convey a fluid through the flowmeter;
a driver configured to oscillate the conduit;
a first sensor configured to generate a first sensor signal indicative of movement of the conduit at a first location;
a second sensor configured to generate a second sensor signal indicative of movement of the conduit at a second location, the first and second locations being arranged so a phase difference between the first and second signals when the conduit is oscillated by the driver is related to a mass flow rate of the fluid through the flowmeter;
a digital signal processor configured to detect the phase difference and determine the mass flow rate of the fluid using the detected phase difference and output a signal indicative of the determined mass flow rate,
wherein the digital signal processor comprises a plurality of detectors tuned to a set of different frequencies, the detectors being configured to analyze at least one of the sensor signals in parallel and generate an output indicative of how closely an actual frequency of said at least one of the sensor signals matches the frequency to which the respective detector is tuned.

2. A Coriolis flowmeter as set forth in claim 1 wherein each of said plurality of detectors comprises a buffer configured to store a series of digital samples of said at least one of the sensor signals, the series having a number of digital samples that is selected to tune the respective detector to a particular frequency of said set of different frequencies.

3. A Coriolis flowmeter as set forth in claim 2 wherein said output indicative of how closely the actual frequency of said at least one of the sensor signals matches the frequency to which the respective detector is tuned is based on an analysis of a waveform of said at least one of the sensor signals represented by the digital samples stored in the buffer.

4. A Coriolis flowmeter as set forth in claim 3 wherein the analysis comprises comparing a current phase estimate for the waveform of said at least one of the sensor signals to a previous phase estimate for the waveform.

5. A Coriolis meter as set forth in claim 4 wherein the previous phase estimate corresponds to a time t at which there is an expected relation between the current phase estimate and the previous phase estimate, wherein the expected relation is based on a relation between t and the period of an ideal waveform having the frequency to which the detector is tuned, and the analysis comprises comparing an actual relation between the current phase estimate and the previous phase estimate to the expected relation between the current phase estimate and the previous phase estimate.

6. A Coriolis flowmeter as set forth in claim 4 wherein the previous phase estimate for the waveform comprises a phase estimate from a time when a sample currently at an end of the series of digital samples corresponding to the oldest data was at an end of the series of digital samples corresponding to the newest data.

7. A Coriolis flowmeter as set forth in claim 4 wherein the digital signal processor uses a quadrature analysis to obtain the phase estimates.

8. A Coriolis flowmeter as set forth in claim 7 wherein the detectors are configured to use static sine and cosine values to perform the quadrature analysis.

9. A Coriolis meter as set forth in claim 2 wherein the buffer comprises a circular buffer.

10. A Coriolis flowmeter as set forth in claim 2 wherein the digital signal processor is configured to identify detectors that are tuned to frequencies adjacent said at least one of the sensor signals and to use interpolation to determine a frequency measurement that is between the frequencies to which the identified detectors are tuned.

11. A Coriolis flowmeter as set forth in claim 1 wherein said frequency associated with said at least one of the sensor signals corresponds to the frequency of a bending mode of vibration of the conduit.

12. A Coriolis flowmeter as set forth in claim 1 wherein the digital signal processor is configured to determine a density of the fluid flowing through the conduit using a frequency estimate determined from the detectors.

13. A system for metering flow of a multiphase fluid, the system comprising:
first and second Coriolis meters, each as set forth in claim 1, wherein each of the first and second Coriolis meters outputs a time-varying mass flow rate measurement of fluid flowing through the respective meter and a time-varying density measurement of fluid flowing through the respective meter;
a signal correlator that compares at least one of the time-varying mass flow rate measurement and the time-varying density measurement from the first Coriolis meter with the respective time-varying mass flow rate or time-varying density measurement from the second Coriolis meter and determines a time delay between matching measurements; and
a measurement system that uses the determined time delay to derive an estimated velocity of a component of the multiphase flow, and correct at least one of the mass flow and density measurements using the estimated velocity.

14. A system as set forth in claim 13 wherein the system is configured to use the estimated velocity to characterize slip between a gas phase and a liquid phase of the multiphase fluid and to correct said at least one of the mass flow and density measurements as a function of the slip.

15. A system as set forth in claim 13 wherein the system is configured to correlate the time-varying mass flow rate measurement from the first Coriolis meter with the respective time-varying mass flow rate measurement from the second Coriolis meter, use the time delay to derive an estimated velocity of a liquid phase of the multiphase fluid, and correct at least one of the mass flow and density measurements using the estimated liquid phase velocity.

16. A system as set forth in claim 13 wherein the system is configured to correlate the time-varying density measurement from the first Coriolis meter with the time-varying density measurement from the second Coriolis meter, use the time delay to derive an estimated velocity of a gas phase of the multiphase fluid, and correct at least one of the mass flow and density measurements using the estimated gas phase velocity.

17. A Coriolis flowmeter as set forth in claim 1 further comprising a digital drive signal generator configured to produce a drive signal based on at least one of the first and second sensor signals and send the drive signal to the driver to oscillate the conduit, wherein the drive signal includes a first component selected to drive oscillation of the conduit in a first vibrational bending mode and a second component selected to drive oscillation of the conduit in a second vibrational bending mode different from the first vibrational bending mode, the drive signal generator being configured to combine the first and second components concurrently with one another so the driver drives the conduit in the first and second vibrational bending modes at the same time.

18. A Coriolis flowmeter as set forth in claim 17 wherein the driver is a first driver and the drive signal is a first drive signal, the Coriolis flowmeter further comprising a second driver configured to oscillate the conduit, the first and second drivers being positioned at different locations on the conduit, the digital drive signal generator being configured to produce a second drive signal based on at least one of the first and second sensor signals, wherein the second drive signal includes the first component and the second component, the drive signal generator being configured to combine the first and second components concurrently with one another in the second drive signal so the first and second drivers collectively drive the conduit in the first and second vibrational bending modes at the same time.

19. A Coriolis flowmeter as set forth in claim 17 wherein the drive signal generator is configured to control the amplitude of the oscillation of the conduit in the first vibrational bending mode and control the amplitude of the oscillation of the conduit in the second vibrational bending mode.

20. A Coriolis flowmeter as set forth in claim 19 wherein the drive signal generator is configured to control the amplitude of the conduit in the first and second vibrational bending modes using a PID control, wherein the PID control comprises two inputs and two outputs, wherein the inputs correspond to information about the amplitudes of oscillation in the first and second bending modes, respectively, and the two outputs correspond to information about drive levels selected to maintain the amplitudes of oscillation in the first and second modes at respective setpoints.

21. A Coriolis flowmeter as set forth in claim 17 wherein said phase difference is a first phase difference, the first phase difference being related to a distortion of the first vibrational bending mode caused by flow of mass through the conduit, the digital signal processor being configured to detect a second phase difference that is related to a distortion of the second vibrational bending mode caused by flow of mass through the conduit, wherein the digital signal processor is configured to determine the mass flow rate of the fluid using the first and second phase differences.

22. A Coriolis flowmeter as set forth in claim 17 wherein the digital signal processor is configured to measure a density of the fluid in the conduit using the frequency of the first vibrational bending mode and the frequency of the second vibrational bending mode.

* * * * *